United States Patent [19]
Joffe et al.

[11] Patent Number: 6,041,059
[45] Date of Patent: Mar. 21, 2000

[54] TIME-WHEEL ATM CELL SCHEDULING

[75] Inventors: Alexander Joffe, Palo Alto; Ari Birger, Sunnyvale, both of Calif.

[73] Assignee: MMC Networks, Inc., Sunnyvale, Calif.

[21] Appl. No.: 08/845,710

[22] Filed: Apr. 25, 1997

[51] Int. Cl.$^7$ .............................. H04L 12/28; H04L 12/56
[52] U.S. Cl. ............................................................ 370/412
[58] Field of Search .................................. 370/230, 412, 370/395, 418, 468, 416, 229, 231, 235, 252, 253, 397, 413, 415, 417, 428, 429, 409

[56] References Cited

U.S. PATENT DOCUMENTS

| | | | |
|---|---|---|---|
| 2,686,844 | 8/1954 | Brewer | 179/81 |
| 4,885,744 | 12/1989 | Lespagnol et al. | 370/94 |
| 5,062,106 | 10/1991 | Yamazaki et al. | 370/94.1 |
| 5,136,584 | 8/1992 | Helund | 370/94.1 |
| 5,231,633 | 7/1993 | Hluchyji et al. | 370/94.1 |
| 5,233,606 | 8/1993 | Pashan et al. | 370/85.6 |
| 5,311,509 | 5/1994 | Heddes et al. | 370/60 |
| 5,337,308 | 8/1994 | Fan | 370/60 |
| 5,457,687 | 10/1995 | Newman | 370/85.3 |
| 5,517,495 | 5/1996 | Lund et al. | 370/60 |
| 5,521,923 | 5/1996 | Willmann et al. | 370/412 |
| 5,528,588 | 6/1996 | Bennett et al. | 370/60 |
| 5,533,009 | 7/1996 | Chen | 370/17 |
| 5,533,020 | 7/1996 | Byrn et al. | 370/412 |
| 5,541,912 | 7/1996 | Choudhury et al. | 370/17 |

(List continued on next page.)

FOREIGN PATENT DOCUMENTS

| | | |
|---|---|---|
| 0 700 186 | 3/1996 | European Pat. Off. |
| WO 95/20282 | 7/1995 | WIPO . |
| WO 95/32570 | 11/1995 | WIPO . |

OTHER PUBLICATIONS

Hongqing Li et al. "A Simulation Study of TCP Performance in ATM Networks with ABR and UBR Services" Proceedings vol. 3, *1996 IEEE Infocom '96*, Fifteenth Annual Joint Conference of the IEEE Computer and Communications Societies, Mar. 24–28, 2996, pp v–xvi and pp 1269–1276 (21 pages total including cover page).

Allyn Romanow et al. "Dynamics of TCP Traffic Over ATM Networks" *IEEE Journal on Selected Areas in Communications*, vol. 13, No. 4, pp 633–641, May 1995.

Alan Demers et al. "Analysis and Simulation Of A Fair Queueing Algorithm" ©1989 ACM, pp 1–12.

"ATMS2003B Switch Controller 1 'White'", *MMC Networks*, Dec. 1995, 32 pages.

Beraldi, R. et al: "Selective BECN Schemes for Congestion Control of ABR Traffic in ATM LAN" , *1996 IEEE Int'l Conf. on Communications (ICC), Converging Technologies for Tommorow's Applications*, Dallas, Jun. 23–27, 1996. pp. 503–507.

G. Mercankosk et al.: "Multiplexing Space Outputs on Cell Emissions"Proceedings of INFOCOM '95 –Conference on Computer Communications, Fourteenth Annual Joint Conference of the IEEE Computer and Communications Societies, Boston Apr. 2–6, 1995, vol. 3, No. CONF. 14, 2 April 1995, pp. 49–55, XP000580562.

Ozveren, C., et al: "Reliable and Efficient Hop–By–Hop Flow Control", *Computer Communications Review*, vol. 24, No. 4, Oct. 1, 1994, pp. 89–100.

(List continued on next page.)

*Primary Examiner*—Ajit Patel
*Attorney, Agent, or Firm*—Skjerven, Morril, MacPherson, Franklin and Friel; Fabio E. Marino

[57] ABSTRACT

A method is provided for the implementation of a time-wheel ATM cell scheduler with very large number of queues that can precisely pace any assigned bandwidth described in [i,m] terms (i cells in m cell-times), as long as m/i>=[number of queues]. The method requires only a small, bounded amount of work per physical connection independent of the number of VCs.

11 Claims, 19 Drawing Sheets

U.S. PATENT DOCUMENTS

| | | |
|---|---|---|
| 5,555,264 | 9/1996 | Sällberger et al. ........................ 370/17 |
| 5,555,265 | 9/1996 | Kakuma et al. .......................... 370/412 |
| 5,557,611 | 9/1996 | Cappellari et al. ..................... 370/60.1 |
| 5,561,663 | 10/1996 | Klausmeier .............................. 370/412 |
| 5,577,035 | 11/1996 | Hayter et al. ............................ 370/412 |
| 5,583,863 | 12/1996 | Darr, Jr. et al. ........................ 370/397 |
| 5,592,476 | 1/1997 | Calamvokis et al. .................... 370/390 |
| 5,629,928 | 5/1997 | Calvignac et al. ...................... 370/237 |
| 5,633,859 | 5/1997 | Jain et al. ................................ 370/234 |
| 5,633,867 | 5/1997 | Ben-Nun et al. ........................ 370/399 |
| 5,689,508 | 11/1997 | Lyles ........................................ 370/391 |
| 5,704,047 | 12/1997 | Schneeberger .................... 395/200.65 |
| 5,715,250 | 2/1998 | Watanabe ................................ 370/395 |
| 5,719,853 | 2/1998 | Ikeda ....................................... 370/229 |
| 5,748,629 | 5/1998 | Caldara et al. .......................... 370/389 |
| 5,751,951 | 5/1998 | Osborne et al. ..................... 395/200.8 |
| 5,765,032 | 6/1998 | Valizadeh ................................ 370/412 |
| 5,771,234 | 6/1998 | Wu et al. ................................. 370/396 |
| 5,809,024 | 9/1998 | Ferguson et al. ........................ 370/395 |
| 5,850,399 | 12/1998 | Ganmukhi et al. ..................... 370/412 |
| 5,926,458 | 7/1999 | Yin .......................................... 370/230 |

OTHER PUBLICATIONS

Hongqing, Li, et al.: "Performance of TCP Over UBR Service in ATM Networks wtih Per–VC Early Packet Discard Schemes" Proceedings of the 1996 IEEE 15th Annual Int' Phoenix Conf. on Computers and Communication, Mar. 27–29, 1996, pp. 350 357.

Tanenbaum, "Computer Networks", Prentice Hall, Inc., The Physical Layer, pp. 148–150 (1996).

Dutton, et al., "Asynchronous Transfer Mode (ATM)", Second Editon, Oct. 1995, International Business Machines Corporation, pp. 3–1 through 3–25 and 9–1 through 9–34.

Flanagan, "ATM Asynchronous Transfer Mode User's Guide", Braking Frames Into Cells, pp. 25–49, (1994).

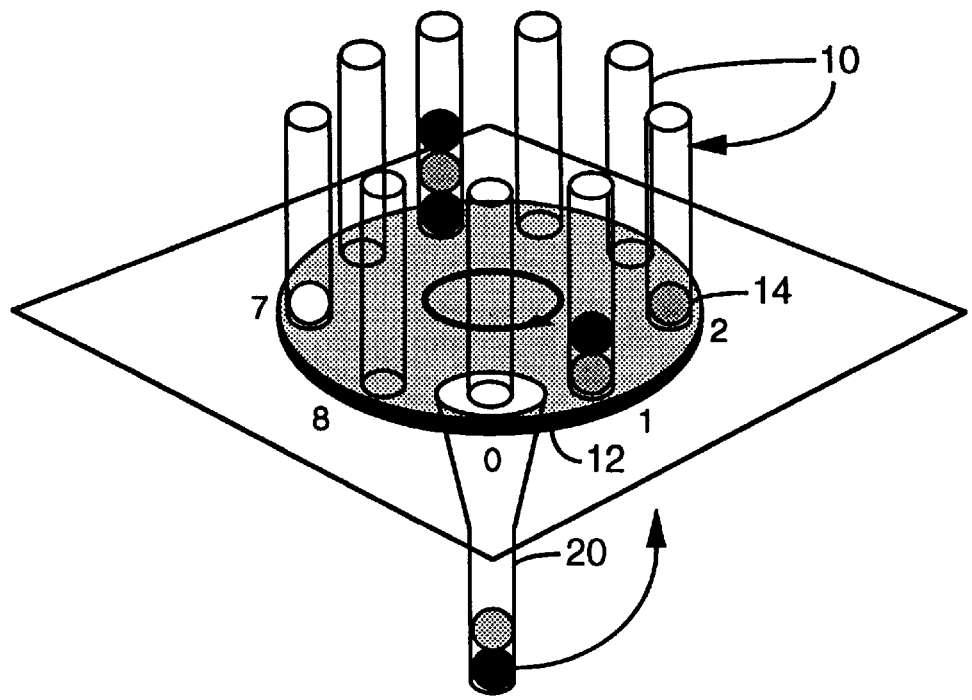
FIG. 3
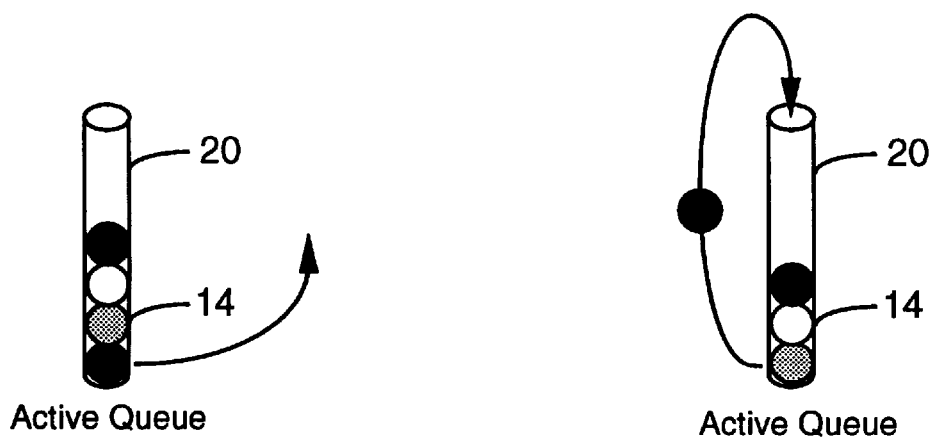
Active Queue
Delta=Step-(Current_time-Timestamp)>0
FIG. 4A
Active Queue
Delta ≤ 0
FIG. 4B 1. Initially Assigned
Bandwidth 2. Small Over-Subscription:
Effect on One VC 3. Higher Over-Subscription:
Effects an Additional VC 4. Even More Over-
Subscription

Time_Stamp=1

FIG. 11B

A=0+1.5=> Step=1; A=0.5
Delta=1-(1-1)=1
Time_Stamp=1+1=2

FIG. 11C

A=0.5+1.5=> Step=2; A=0
Delta=2-(2-2)=2
Time_Stamp=2+2=4

FIG. 11D

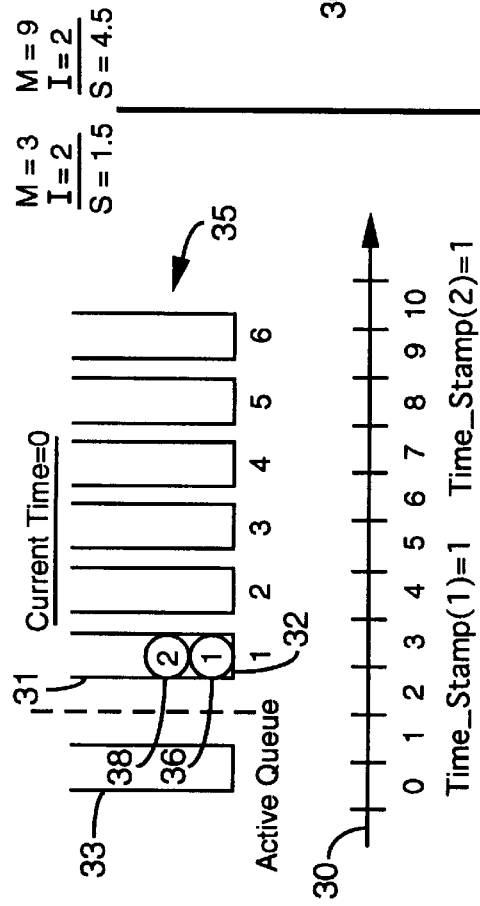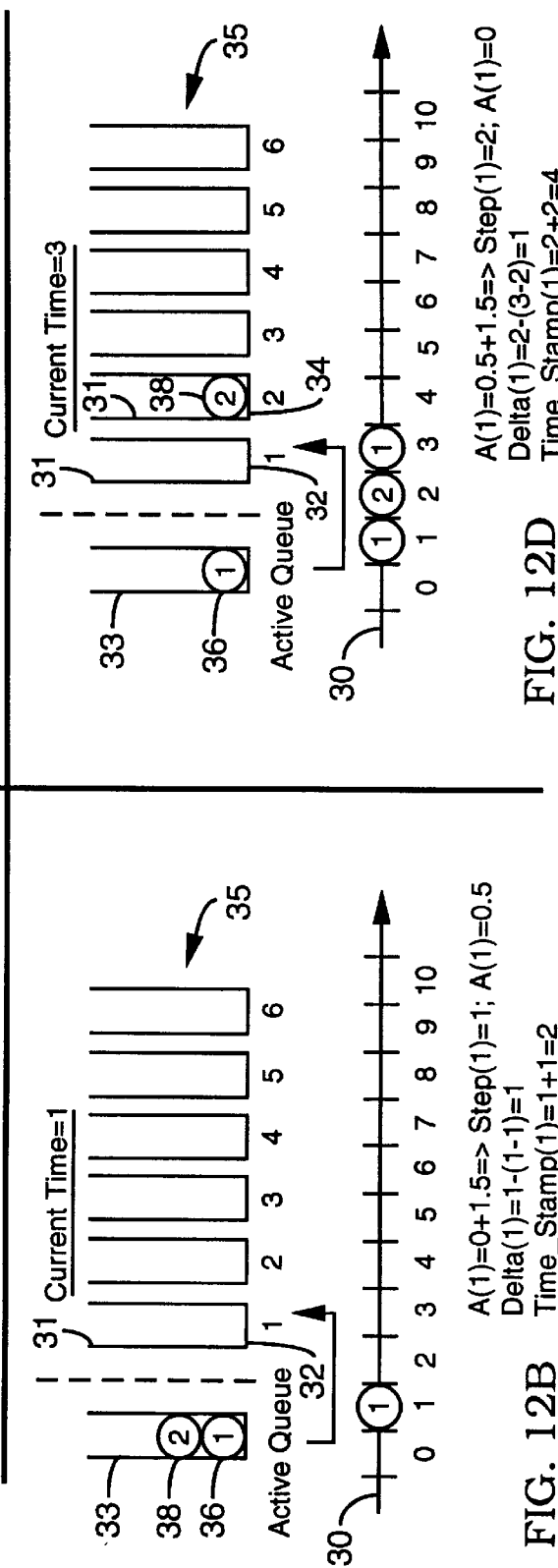
FIG. 12A
FIG. 12B
FIG. 12C
FIG. 12D

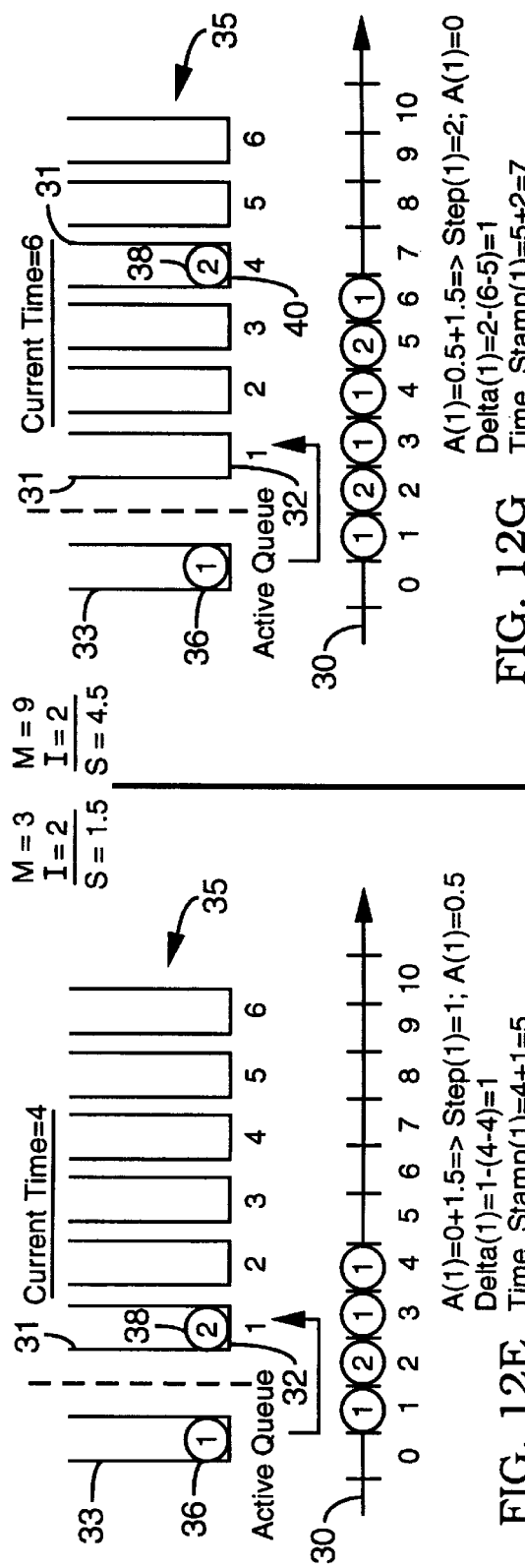
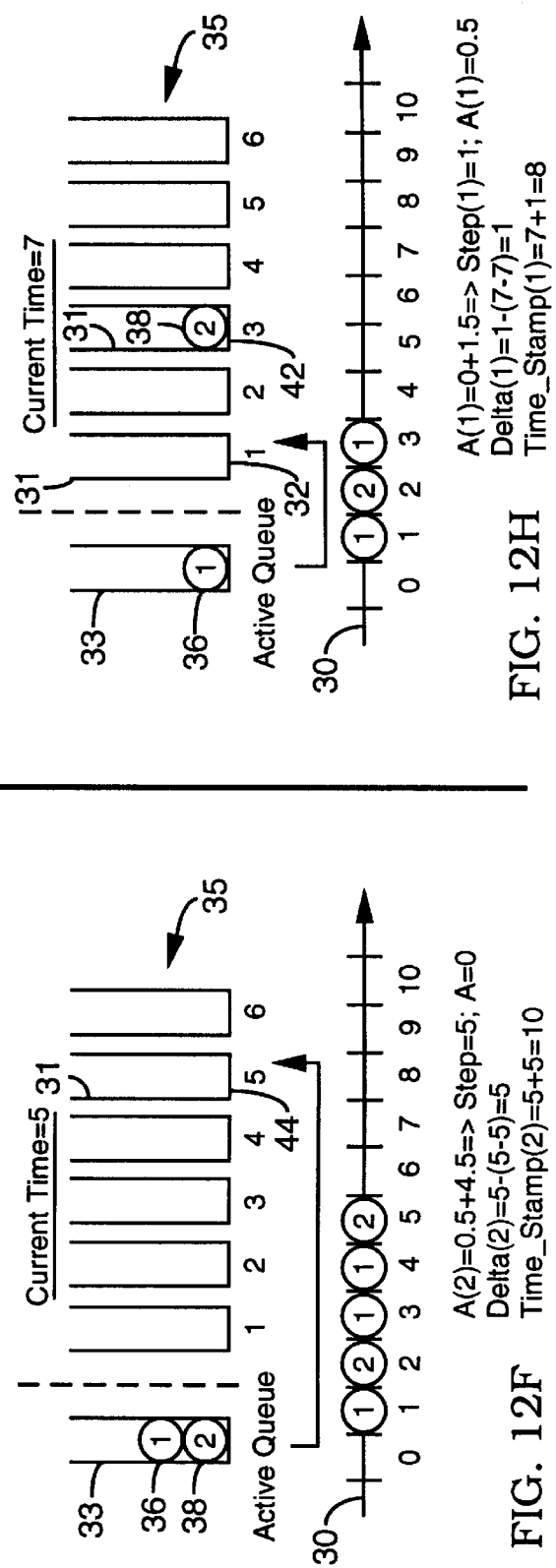
FIG. 12E
FIG. 12F
FIG. 12G
FIG. 12H

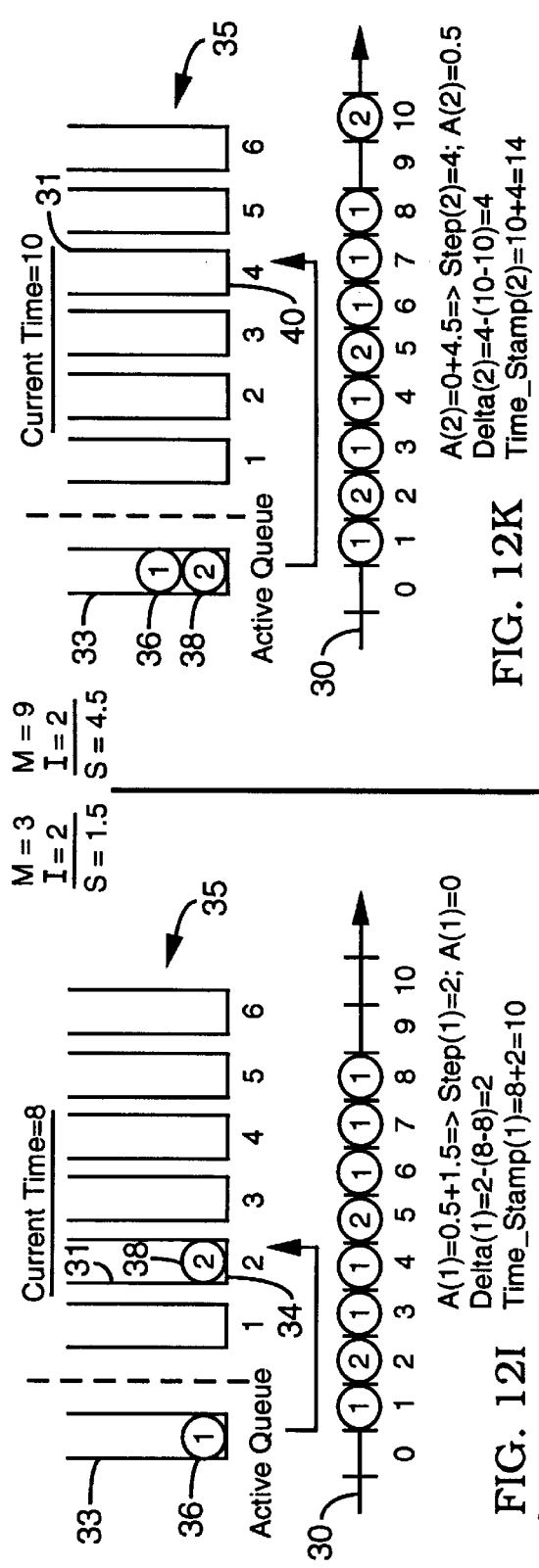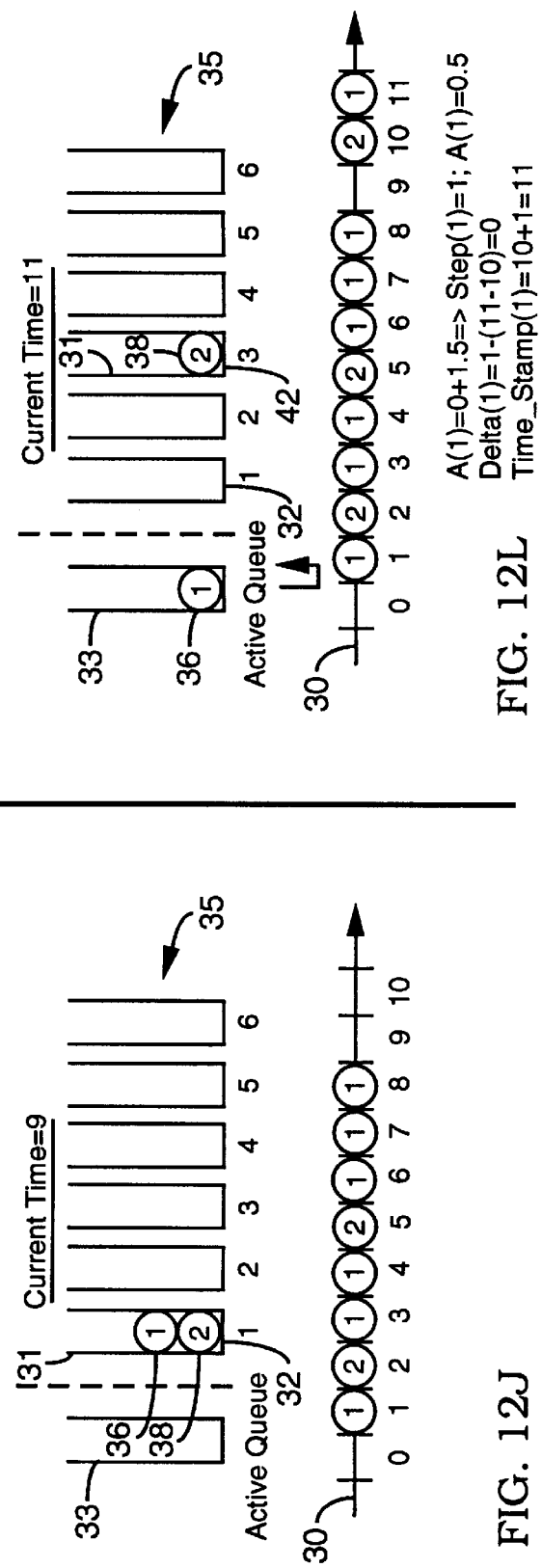
FIG. 12I  FIG. 12J  FIG. 12K  FIG. 12L

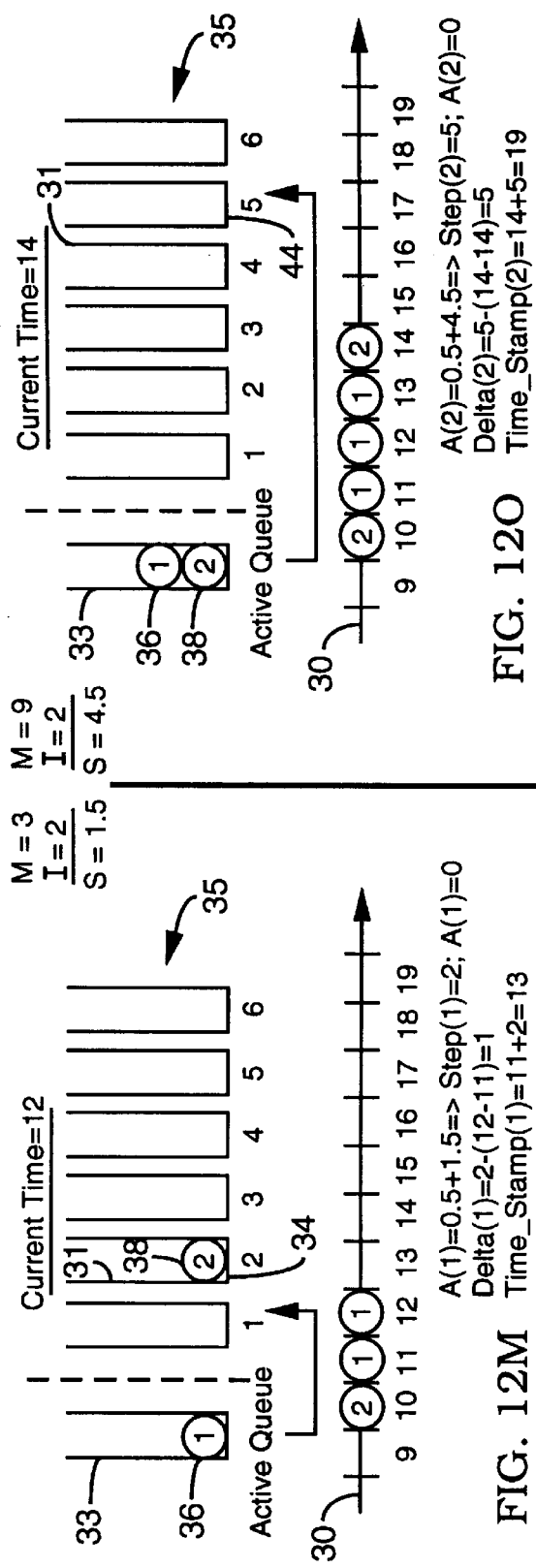
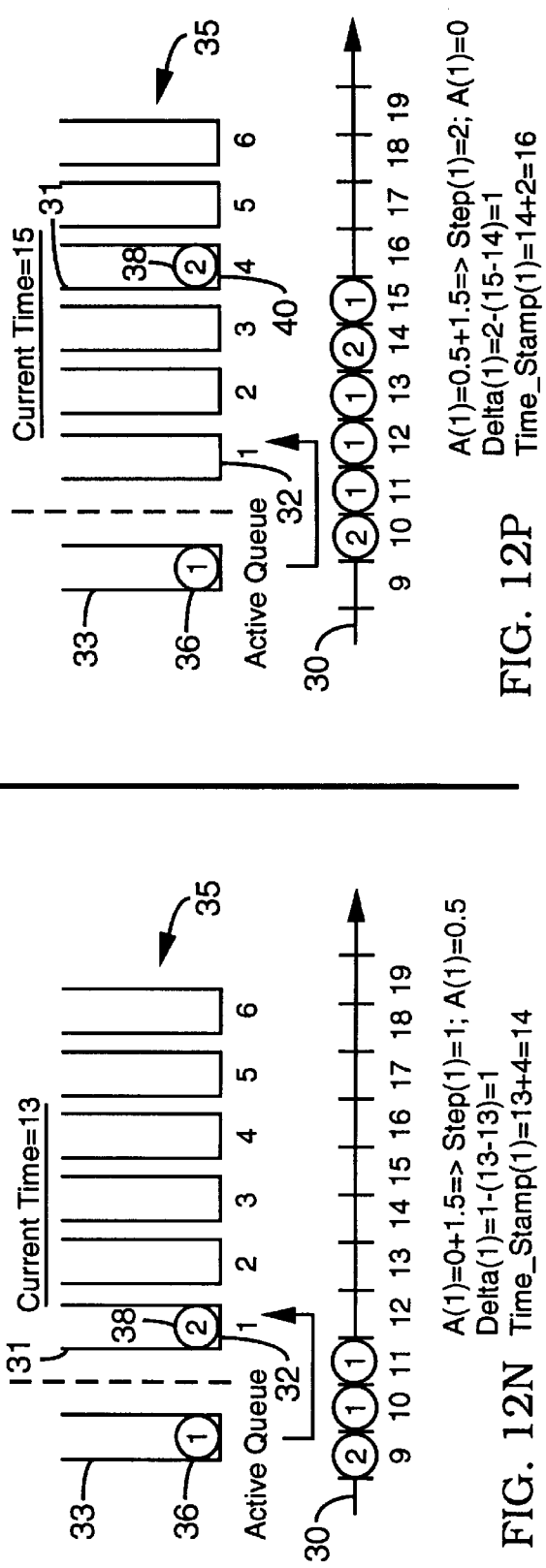

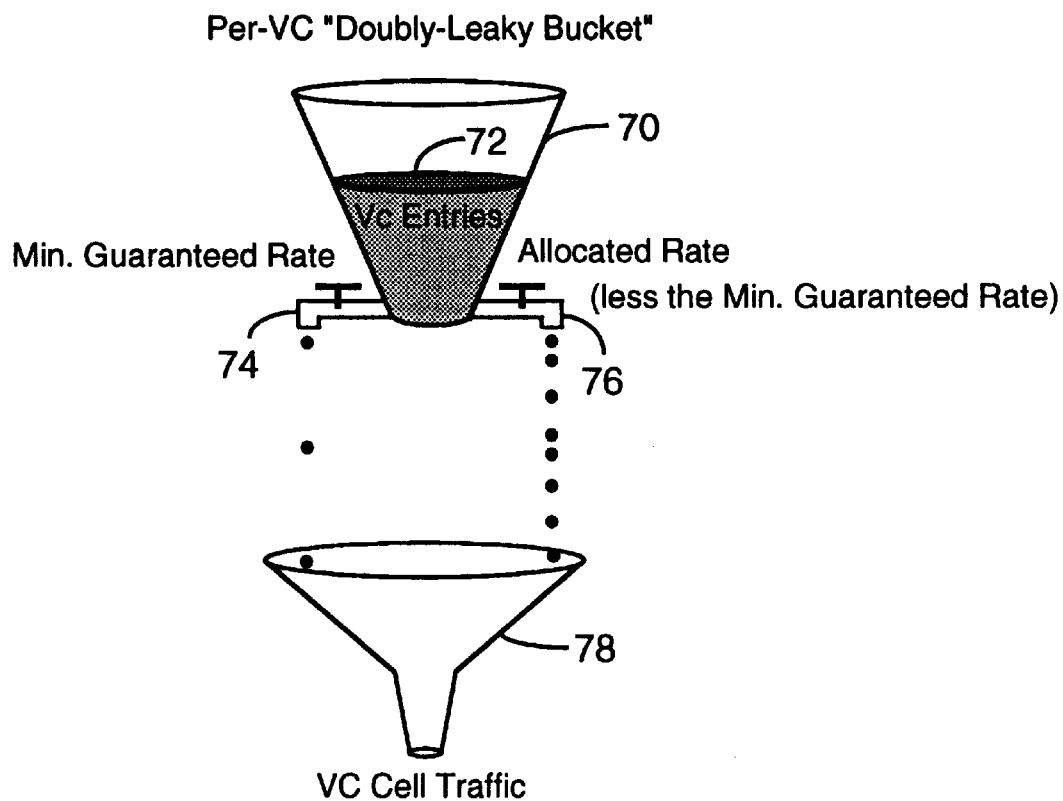
FIG. 15
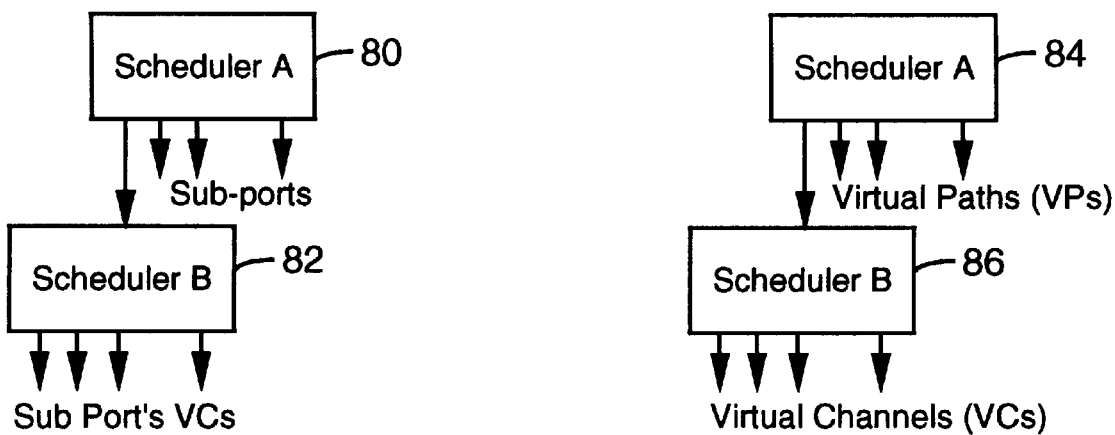
FIG. 16
FIG. 17

TIME-WHEEL ATM CELL SCHEDULING

BACKGROUND OF THE INVENTION

1. Field of the Invention

The invention relates generally to cell scheduling in Asynchronous Transfer Mode (ATM) networks, and more specifically to time-wheel cell scheduling in ATM networks.

2. Background Art

Reference is now made to FIG. 1 of the drawings, showing a simple prior art time-wheel scheduler. A number of queues 10 are organized in a round queue of queues 12. Each queue 10 contains zero or more Virtual Channel (VC) entries 14 to be transmitted. Two time pointers are employed to control the operation of the scheduler: a time pointer 16 and a transmission pointer 18. The time pointer 16 advances clockwise from one queue 10 to the next queue 10 every cell time, indicating that all VC entries 14 in the queues 10 behind it are to be transmitted as soon as possible. The transmission pointer 18 either lags behind or steps together with time pointer 16, indicating which queue 10 is currently being serviced. Scheduling is typically done by an external manager (not shown in the drawings) which is responsible for placing VC entries 14 in queues 10.

Simple time-wheel cell schedulers, as the one depicted in FIG. 1, have several limitations: first, complex computations are required every time transmission pointer 18 reaches a new queue, even if the queue is empty. As a result of the need for calculation, the total number of queues that can be implemented is also limited. Further, the limitation on the number of queues also limits the minimum bandwidth and the bandwidth resolution that can be assigned to a VC. Any changes to the number or the attributes of the VCs require complex calculations to be redone to determine the fixed entries in the queues.

There is a need for an easy-to-implement method for constant bit rate (CBR) and variable bit rate (VBR) cell scheduling with high resolution of bandwidth and the ability to support a large number of VCs.

SUMMARY OF THE INVENTION

Accordingly, the present invention provides an easy to implement method for CBR and VBR cell scheduling with high resolution of bandwidth and able to support a large number of VCs.

The invention further eliminates the need for complex computations every time the transmission pointer reaches a new queue, even if the queue is empty.

In addition, the invention eliminates the need for complex calculations in case changes are made to the number or the attributes of the VCs.

To achieve the foregoing and other objectives, and in accordance with the purposes of the present invention, a time-wheel ATM cell scheduler is provided that allows for high resolution of bandwidth and a large number of VCs, with an automatic rescheduling scheme which eliminates the need for complex recalculations.

The scheduler includes a number of rotating queues, one or more stationary queues and means to transfer VC entries between rotating and stationary queues. The scheduler operates by progressively bringing in contact each of the rotating queues with the stationary queue. All VC entries in the rotating queue are then transferred to the stationary queue and one entry is transmitted on the physical channel every cell-time (if the entry exists).

Immediately after transmission the entry is rescheduled on an upcoming rotating queue according to a step determined by the VC's [m,i] attributes (m cells in i cell-times). If m/i is not an integer, its fractional part is stored in an accumulation register. The next rotating queue then is brought into contact with the stationary queue and its entries are added to the stationary queue. Another entry is then transmitted and rescheduled on an upcoming queue. When the accumulation register overflows, the step with which the cell just transmitted is rescheduled is incremented by one.

As a result, no global computations are required if either new VCs are added or the properties of existing VCs are modified. In addition, the scheduler is able to handle any number of VCs as long as m/i is less than or equal to the number of queues.

As the queues become increasingly oversubscribed, cells may end up waiting in the stationary queue longer than their desired step. To solve this problem, a timestamp is added to each VC entry when it is placed in the appropriate upcoming rotating queue. When the cell is rescheduled, its timestamp is compared to the current time and, if the difference is greater than its computed step, it is rescheduled to the stationary queue.

As a result, the bandwidth of different VCs are adjusted as the channel becomes increasingly oversubscribed: VCs with higher bandwidths are rescheduled to the stationary queue more often, thus reducing their bandwidths, while VCs with lower bandwidths are rescheduled to the stationary queue less often, thus maintaining their assigned bandwidths. Accordingly, the scheduler can handle variations in both the number and properties of VCs without need for recalculation.

BRIEF DESCRIPTION OF THE DRAWINGS

The accompanying drawings incorporated in and forming part of the specification, illustrate several aspects of the present invention and, together with the description, serve to explain principles of the invention. In the drawings:

FIG. 3 is a perspective view of another embodiment of the present invention.

FIGS. 4A and 4B are partial views of the stationary queue component of FIG. 3.

FIGS. 11A–11H and 12A–12P are pictorial representations of the operation of the present invention.

FIG. 15 is a pictorial representation of a "doubly leaky bucket."

FIGS. 16–17 are pictorial representations of multiple scheduler embodiments of the present invention.

DETAILED DESCRIPTION OF THE INVENTION

Figure 1:
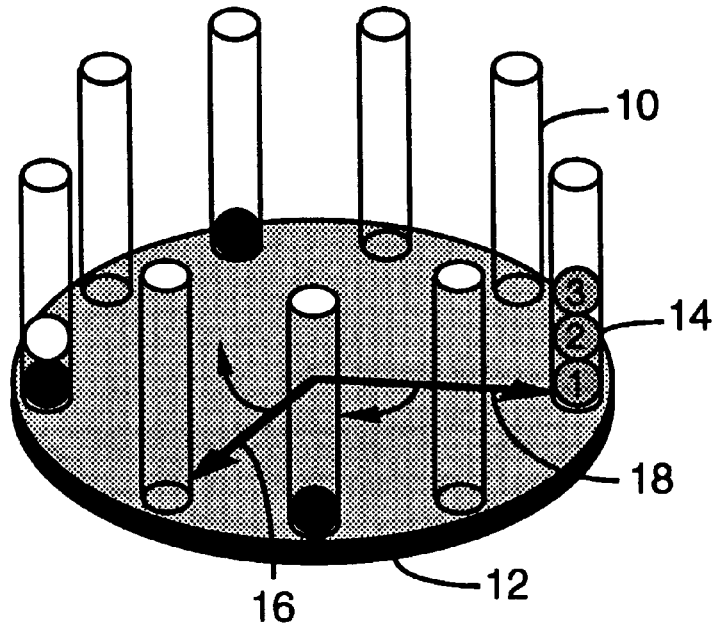
FIG. 1 is a perspective view of a simple prior art time-wheel cell scheduler.
Figure 2:
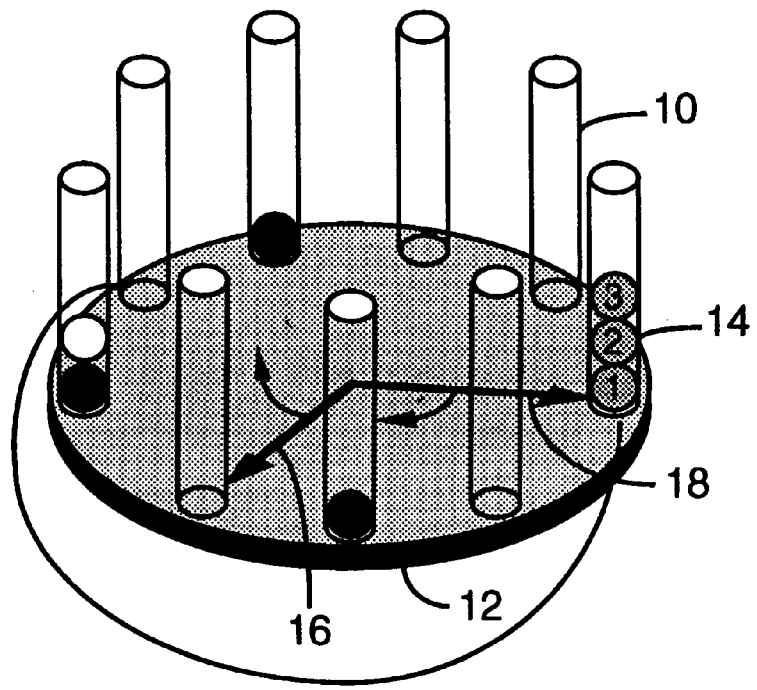
FIG. 2 is a perspective view of a time-wheel cell scheduler employing an automatic rescheduling scheme according to one embodiment of the present invention.

FIG. 2 depicts an improvement over the simple prior art scheduler of FIG. 1, and employs an automatic rescheduling scheme rather than having fixed entries in the queues. The operation of this scheduler is somewhat analogous to that of the simple scheduler of FIG. 1, except that when a VC is serviced, it is removed from its present queue 10 and placed in an upcoming queue 10 according to some predefined fixed step. The step determines the bandwidth assigned to the VC. As long as no two VCs are placed on the same queue, changes in the number or properties of other VCs will have no effect on the bandwidth of that VC. The minimum bandwidth supported, however, is still equal to the bandwidth of the channel divided by the number of queues and the discrete bandwidths supported are equal to the minimum bandwidth multiplied by the step size. Calculations are still required every time the transmission pointer reaches a new queue, even if the queue is empty.

Reference is now made to FIG. 3 of the drawings depicting the preferred embodiment of the present invention. As in the background art depicted in FIG. 1, a time wheel 12 is constructed, consisting of a round-robin queue of queues 10. VC entries 14 scheduled for transmission are placed in queues 10. Time wheel 12 rotates clockwise, one step every ATM cell time. A stationary queue 20, is attached to location 0 on time wheel 12. Whenever a rotating queue 10 reaches location 0 on time wheel 12, its entries 14 are added to stationary queue 20. Once every cell time a VC entry 14 in stationary queue 20 is taken for transmission and immediately rescheduled, by being placed in an upcoming queue 10.

The step used in placing the VC entry into an upcoming queue is calculated according to two measures: (1) channel assigned bandwidth; and (2) effect of other VCs.

Figure 5:
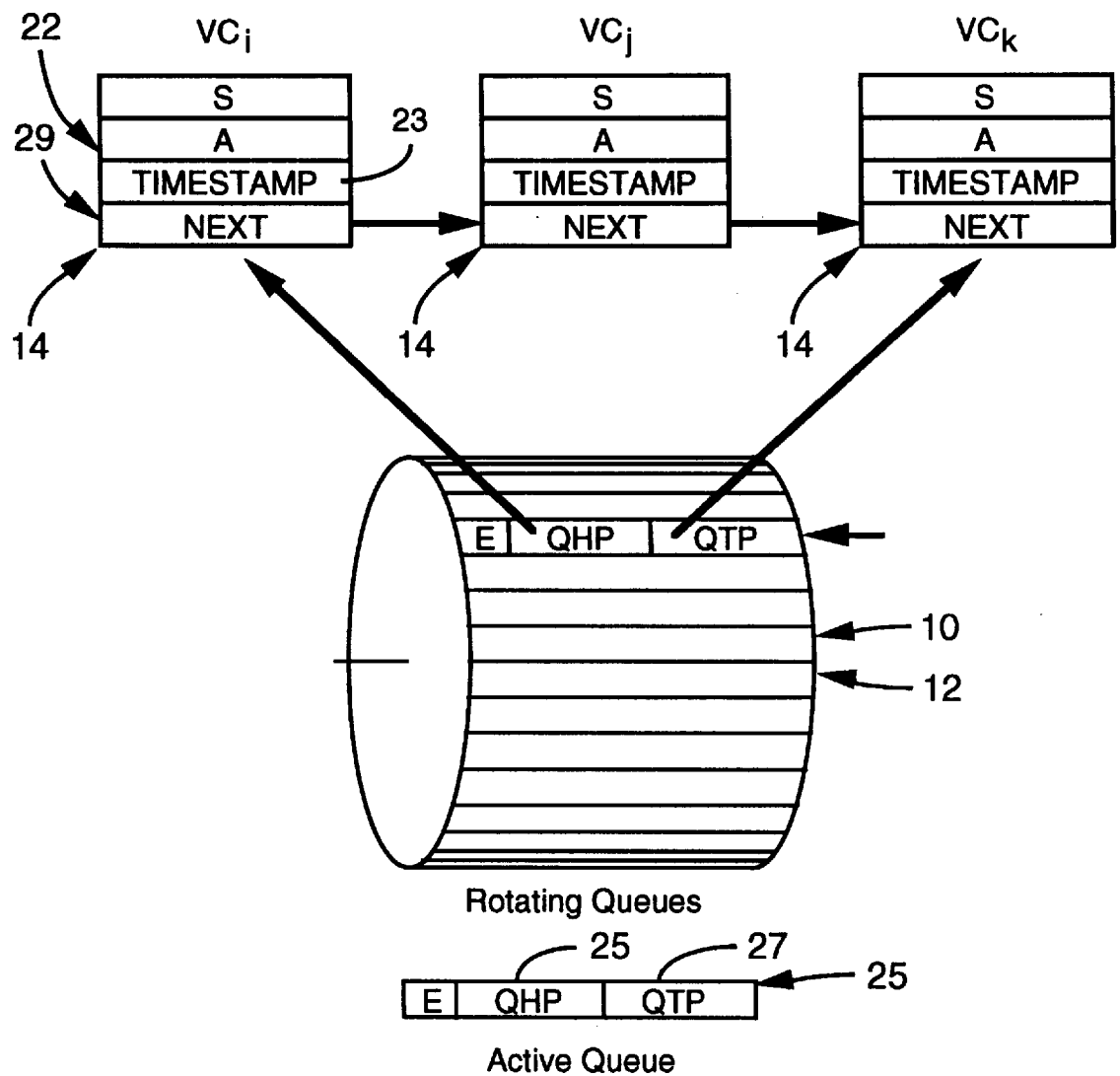
FIG. 5 is a block diagram of an embodiment of the present invention.
Figure 6A:
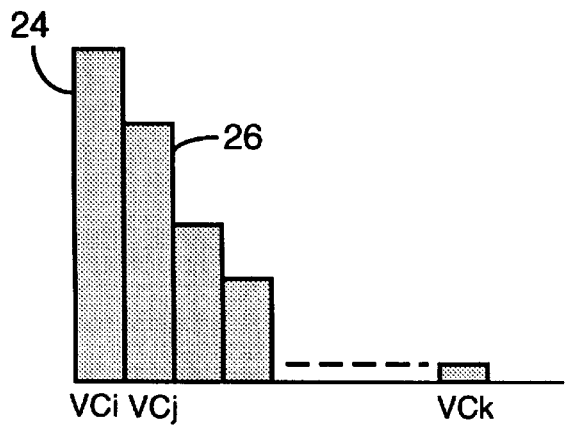
FIGS. 6A–6D are two-dimensional graphs representing the effects of over-subscription on the bandwidth of virtual channels.
Figure 6B:
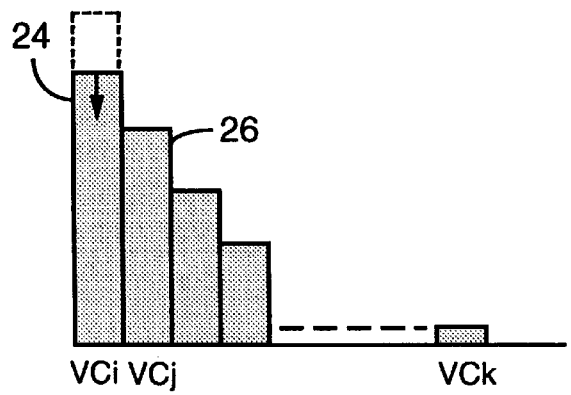
Figure 6C:
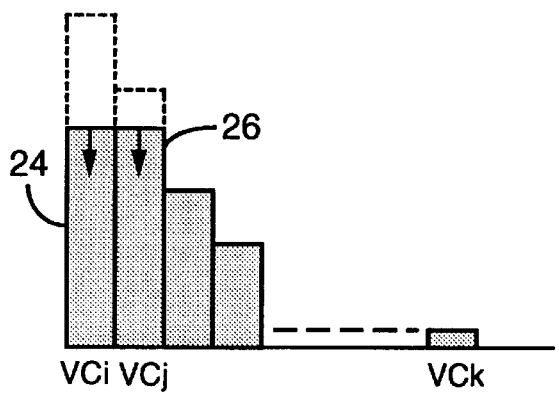
Figure 6D:
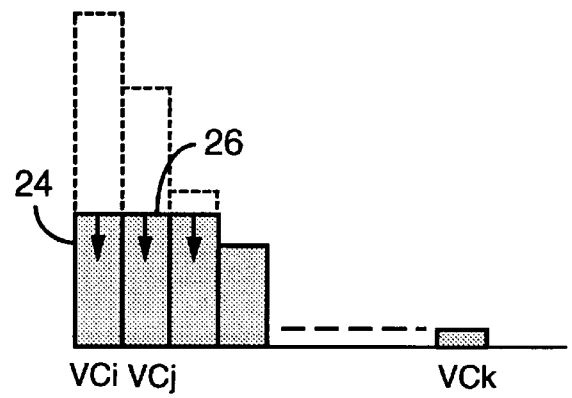

The bandwidth assigned to a VC is defined by two parameters i and m, as i cells in m cell-times. The bandwidth assigned to a VC is thus equal to the bandwidth of the entire physical channel multiplied by the ratio i over m of the parameters defining the VC. Ideally, cells from a virtual channel should be spread evenly in the physical channel and cells should be emitted every m/i cell times. Thus, if m/i is an integer the step will simply be m/i. If, however, m/i is not an integer its integer part is taken in the initial step and its fractional part is added to accumulation register 22, shown in FIG. 5. In FIG. 5, time wheel 12 is shown as a cylindrical shape formed by rotating queues 10. Each rotating queue contains a head pointer 25 and a tail pointer 27, pointing to the head and the tail of queue of VC entries 14. Each VC entry 14, comprises a step 21, which is a real number equal to m/i, an accumulation register 22 and a pointer 29 to the next VC entry 14 in the rotating queue 10. When accumulation register 22 overflows, the step size is increased. The step generation is more formally described in Table 1, where A is the value stored in accumulation register 22 and S is the value stored in step 21, i.e. m/i.

TABLE 1

Step Generation.

A = 0;
When cell transmitted:
{
    A = A + S;
    Step = integer_part (A);
    A = A - Step;
}

When there is more than one VC entry 14 in the stationary queue 20, VCs are serviced one per each cell time. Thus, the time that each VC entry has waited in the stationary queue must be taken into account in calculating the step size. This is done by adding a timestamp 23 to VC entries 14, as shown in FIG. 5. When the VC is serviced, its timestamp is compared to the current time and the difference is subtracted from the step size. If the difference is larger than or equal to the step size, the VC entry 14 is placed back on stationary queue 20, as shown in FIG. 4B, otherwise it is placed on an upcoming rotating queue 10 according to its step size, as shown in FIG. 4A.

This process is more formally described in Table 2.

TABLE 2

Queue Processing.

Every Cell period
{
if Active_Queue is not Empty
{
    remove VC from Active_Queue;
    send cell;
    generate Step;
    Delta = Step - (Curr_Time - Time_Stamp);
    if Delta > 0
        queue_VC (Delta);
    else
        queue_VC (active_queue);
        Time_Stamp = Time_Stamp + Step;
}
Curr_Time++;
Rotate Queues;
append Top_Q to Active_Q;
}

Figure 18:
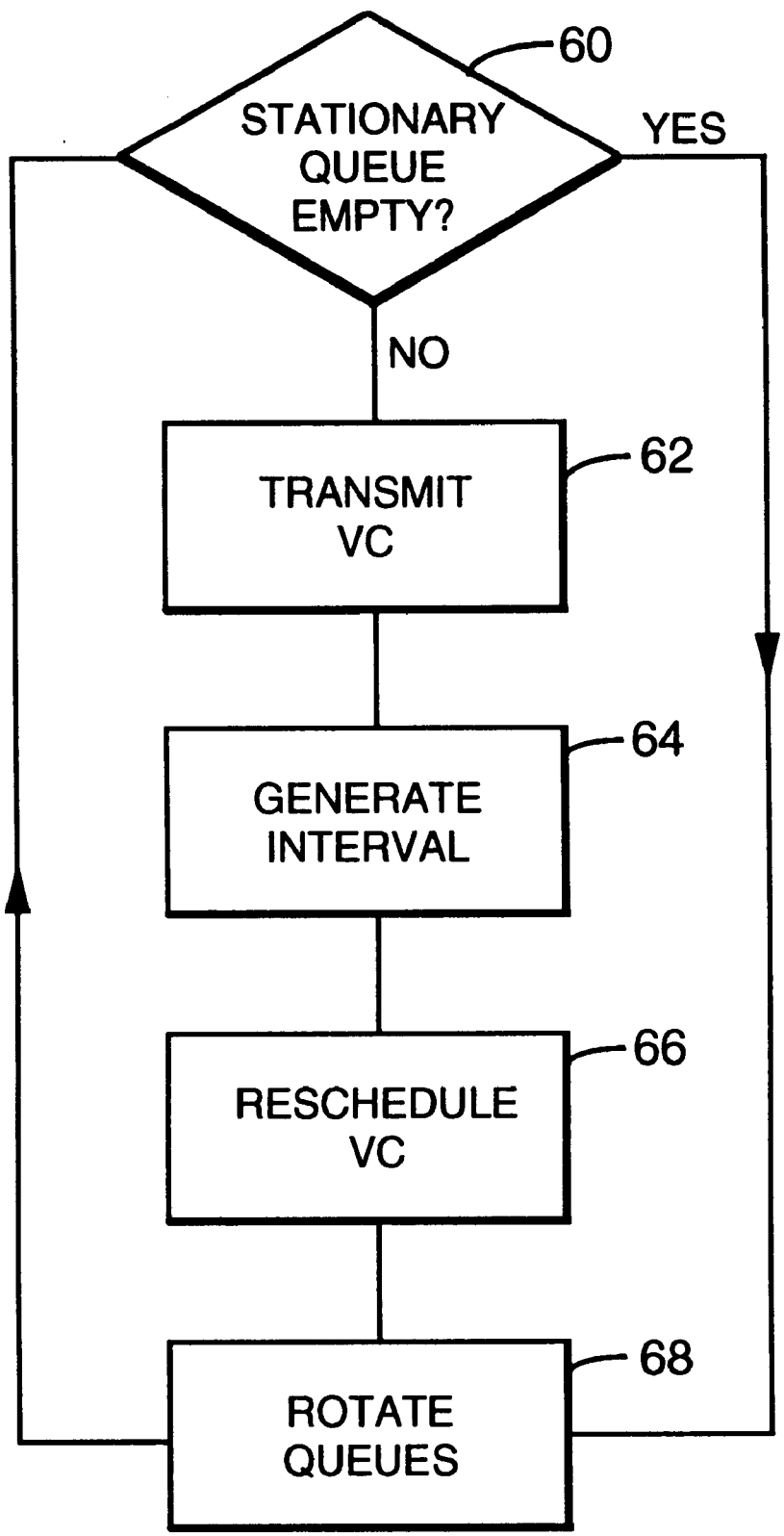
FIG. 18 is a flowchart diagram of the processing of VC entries.

FIG. 18 is a flowchart diagram further describing the process of Table 2. In step 60, it is determined whether there are any VC entries scheduled on the stationary queue. If there are, the first of these VC entries is transmitted in step 62. The interval with which the the VC entry is to be rescheduled is then generated in step 64. In step 66, the VC entry is rescheduled. Finally, in step 68 the queues are rotated and the process repeats.

Reference is now made to FIGS. 6A–6D, showing graphs of VC bandwidth allocation at successive points in time. As the physical channel is oversubscribed, i.e. the sum of the bandwidths of all VCs exceeds the bandwidth of the physical channel, the entries of the VC with the highest bandwidth 24 will be constantly placed back on the stationary queue, effectively reducing its bandwidth. The process will then be repeated for the VC with the next highest bandwidth 26. If oversubscription continues, eventually all VCs will share the same effective bandwidth.

FIGS. 7–10 show examples of the functioning of the invention for different VC configurations.

Figure 7:
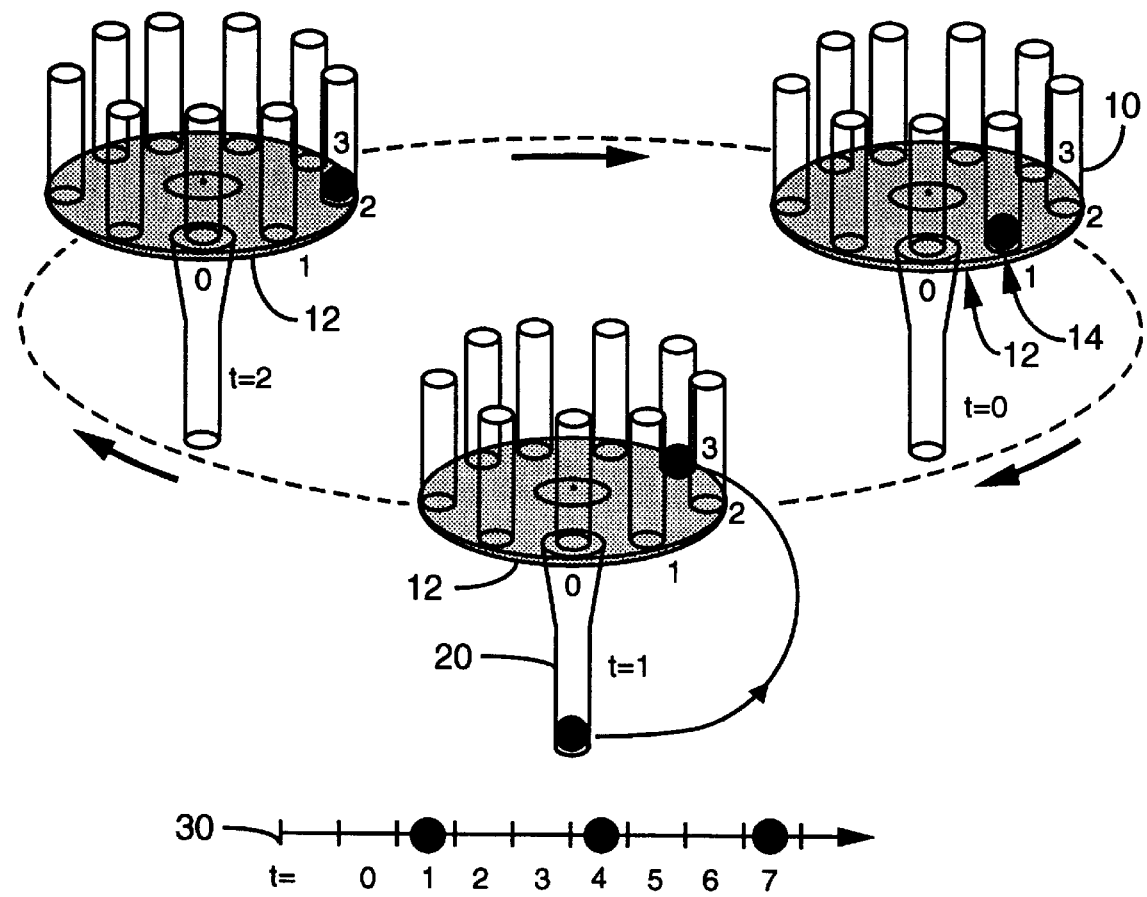
FIGS. 7–10 are examples of the operation of the present invention, illustrating perspective views of the preferred embodiment of FIG. 3 at successive times in the operation of the invention.

FIG. 7 shows the simple case of a single VC entry 14 on time-wheel 12 with m and i parameters equal to 3 and 1 respectively. At time=0, VC entry 14 is in rotating queue 10, one position removed from stationary queue 20. At time=1, rotating queue 10 reaches stationary queue 20, its contents are transferred to stationary queue 20, VC entry 14 is transmitted on transmission line 30 and rescheduled onto rotating queue 10 three positions removed from stationary queue 20. At time=2, time wheel 12 rotates bringing rotating queue 10, on which VC entry 14 is placed, two positions removed from stationary queue 20.

Figure 8:
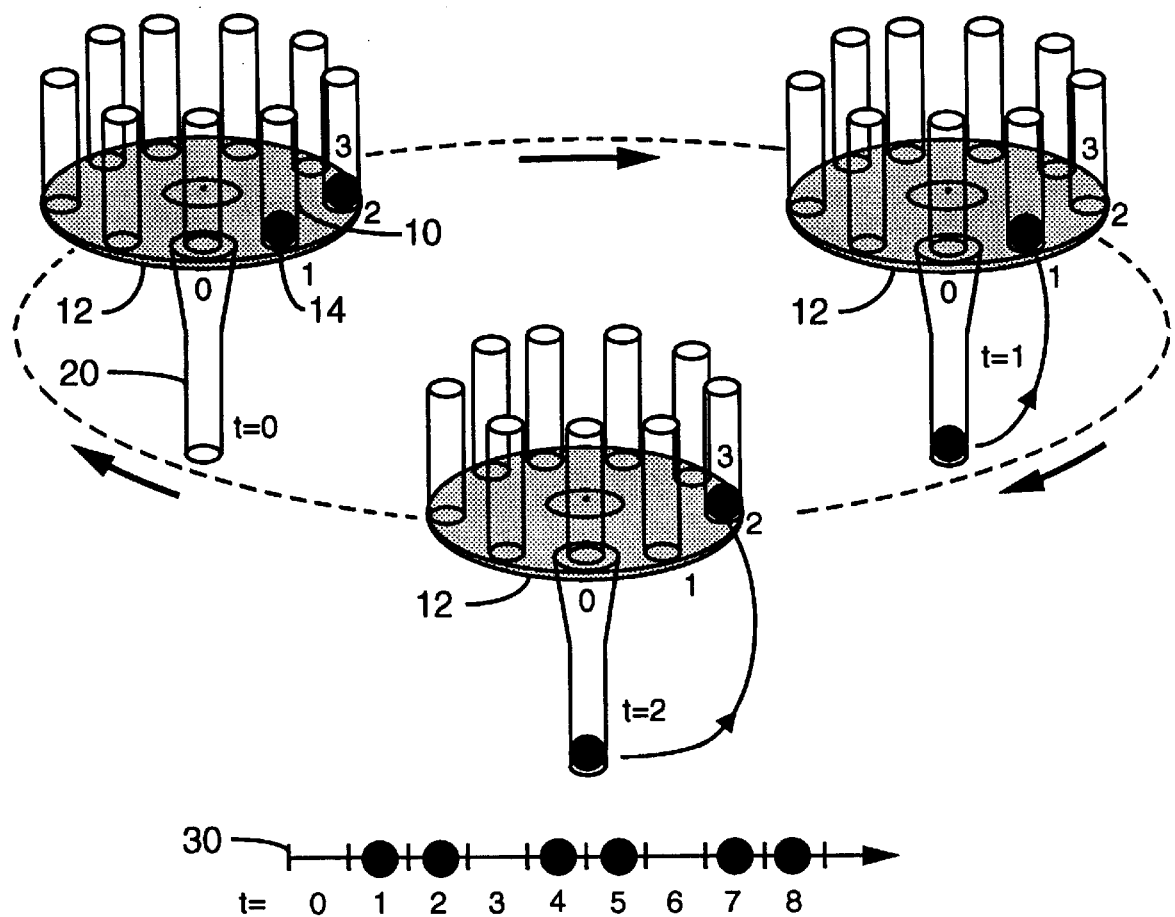

FIG. 8 illustrates a single VC entry 14 on time wheel 12, with m and i parameters equal to 3 and 2, respectively. At time=0, VC entry 14 is in rotating queue 10, one position removed from stationary queue 20. At time=1, rotating queue 10 reaches stationary queue 20, its contents are transferred to stationary queue 20, VC entry 14 is transmitted on transmission line 30 and rescheduled onto rotating queue 10 one position removed from stationary queue 20. Since the step for m/i=3/2 would be 1.5, 0.5 is stored in accumulation register 22. At time=2, rotating queue 10 reaches stationary queue 20, its contents are transferred to stationary queue 20, VC entry 14 is transmitted on transmission line 30 and rescheduled onto rotating queue 10 two positions removed from stationary queue 20, the 0.5 stored in accumulation register 22 is added to step m/i=1.5.

Figure 9:
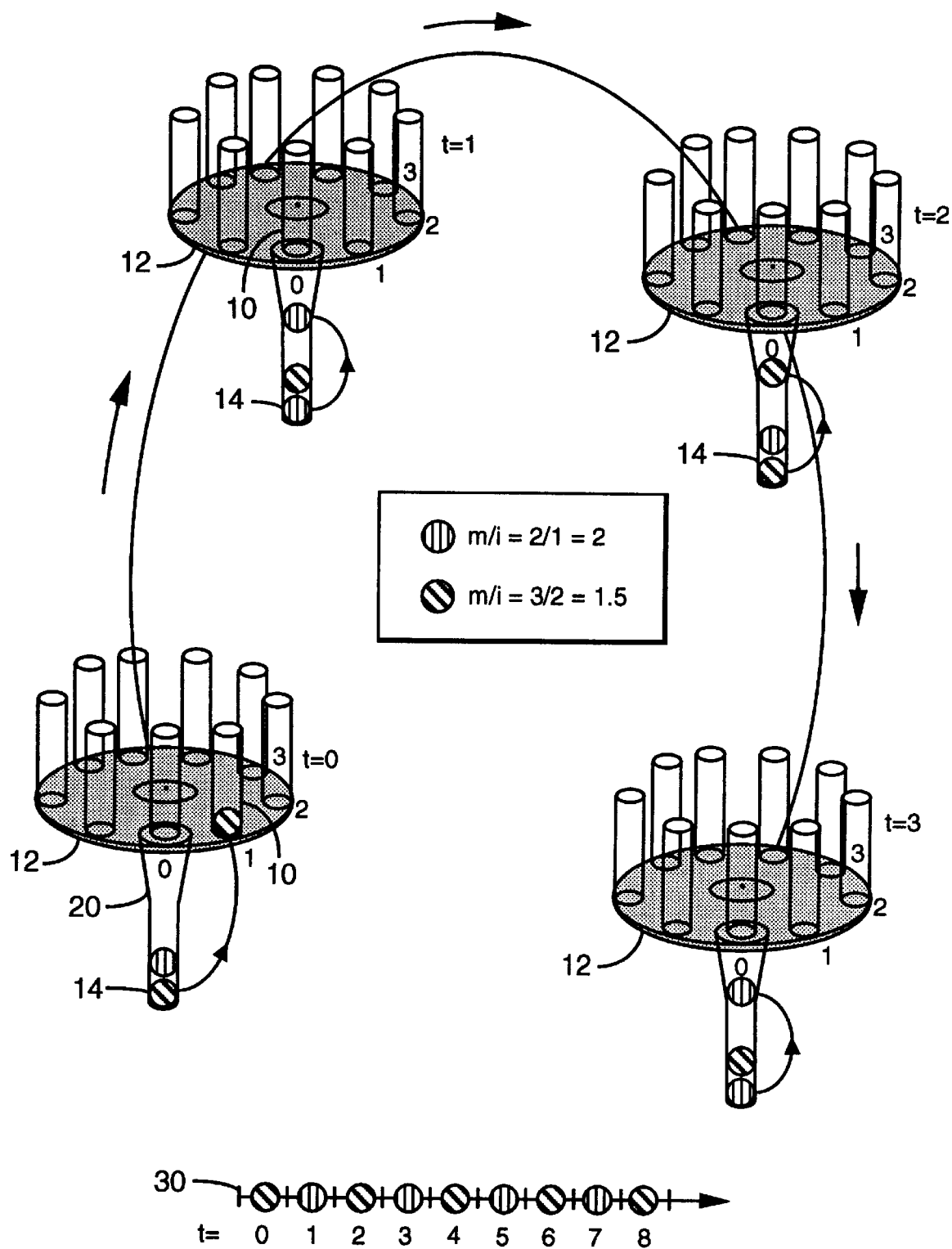

FIG. 9 shows a more complicated example with two VC entries 14 with m and i parameters equal to 2 and 1 and 3 and 2 respectively. At time=0, VC entry 14 with m/i term=3/2 on stationary queue 20 is transmitted on transmission line 30 and rescheduled onto rotating queue 10 one position removed from stationary queue 20. Since the step for m/i=3/2 would be 1.5, 0.5 is stored in accumulation register 22. At time=1, rotating queue 10 reaches stationary queue 10 and its contents are transferred onto stationary queue 20. VC entry 14 with m/i term=2/1 on stationary queue 20 is transmitted on transmission line 30 and rescheduled to the end of stationary queue 20, since time stamp 23 is equal to step m/i=2. At time=2, VC entry 14 with m/i term=3/2 is transmitted on transmission line 30 and rescheduled at the end of stationary queue 20, since between the current time and time stamp 23 is greater than the step size, computed by adding the value stored into accumulation register 22, 0.5, to m/i=1.5. At time=3, VC entry 14 with m/i term=2/1 on stationary queue 20 is transmitted on transmission line 30 and rescheduled to the end of stationary queue 20, since the difference between the current time and time stamp 23 is equal to step size m/i=2.

Figure 10:
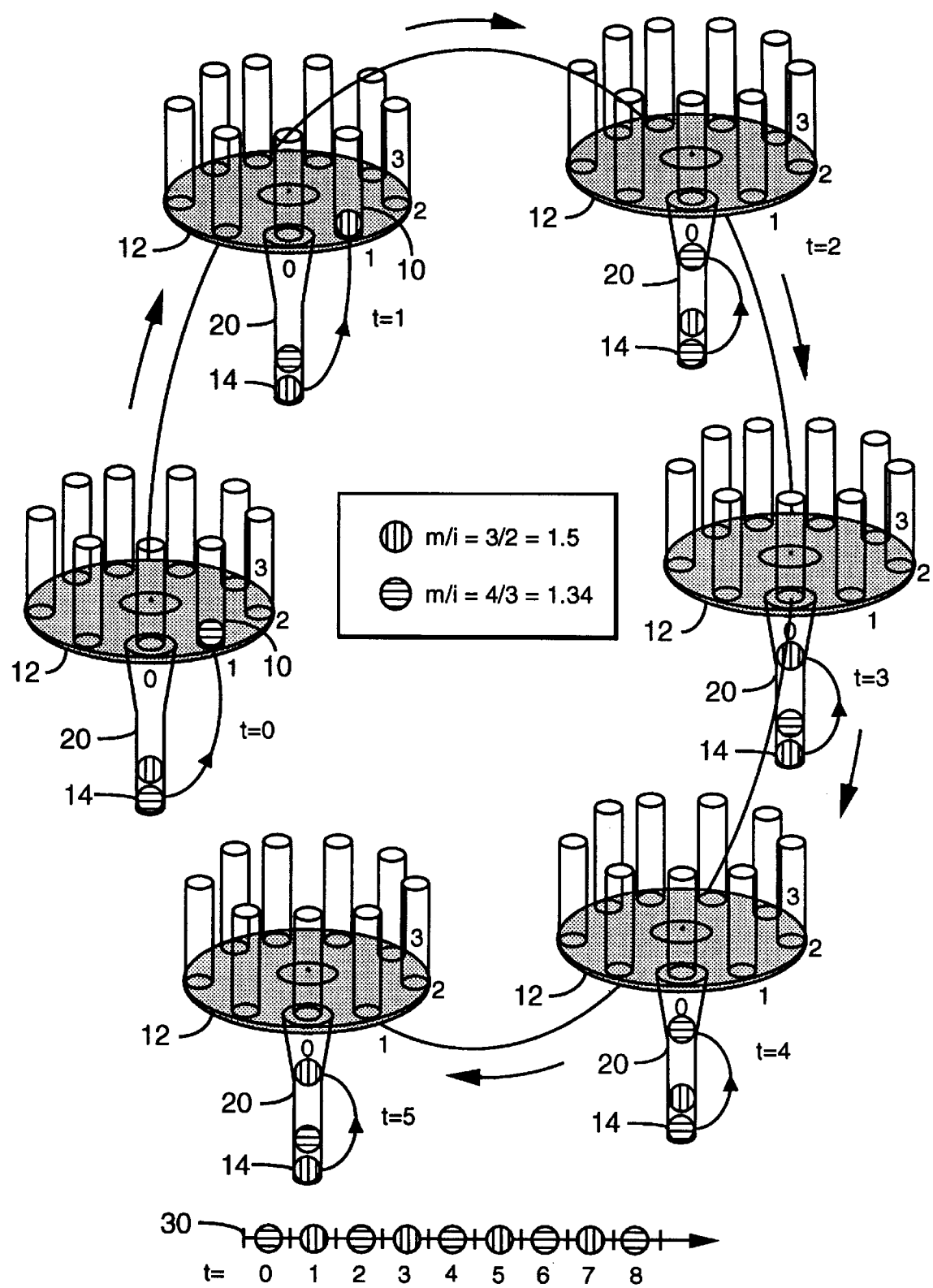
Figure 11E:
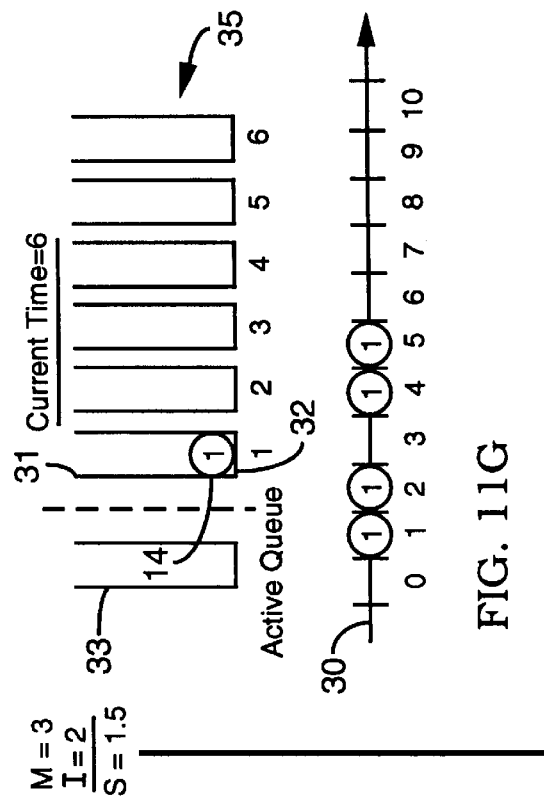
Figure 11F:
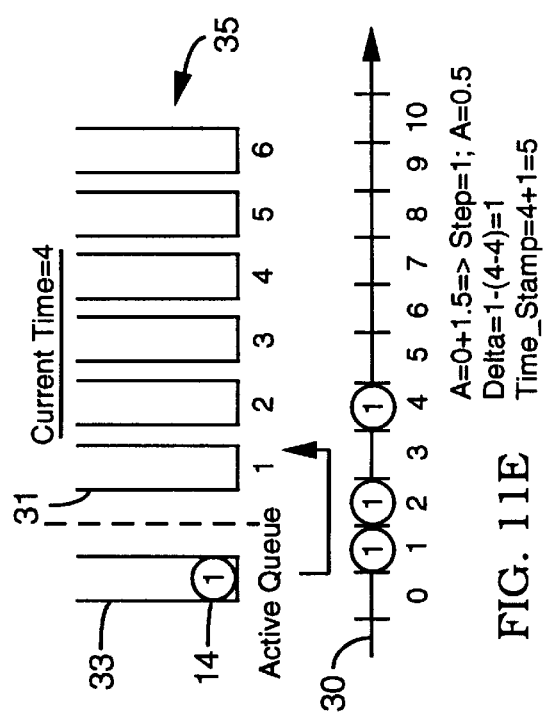
Figure 11G:
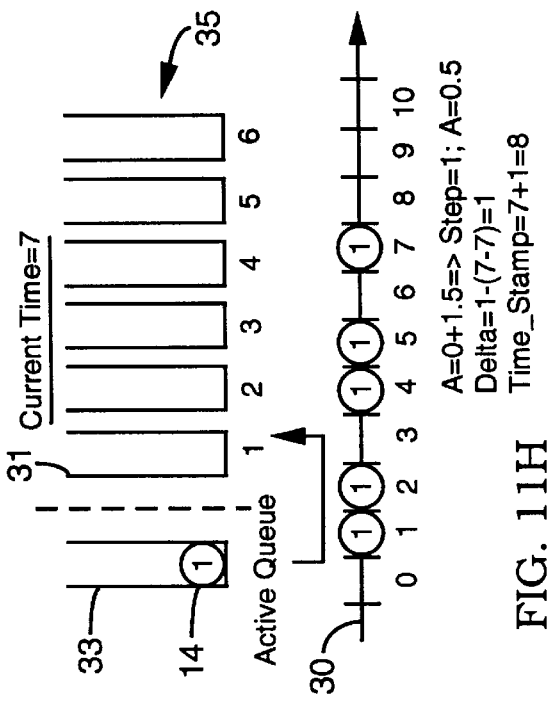
Figure 11H:
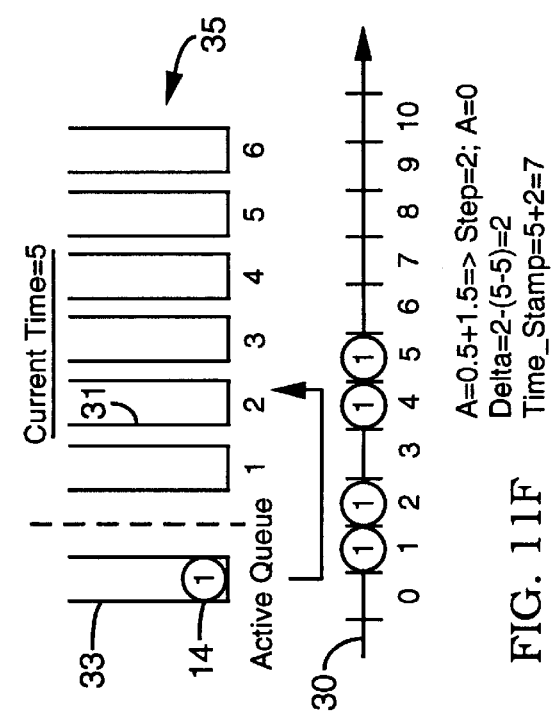

FIG. 10 shows a more complicated example with two VC entries 14 with m and i parameters equal to 3 and 2 and 4 and 3 respectively. At time=0, VC entry 14 with m/i term=4/3 on stationary queue 20 is transmitted on transmission line 30 and rescheduled onto rotating queue 10 one position removed from stationary queue 20. Since the step for m/i=4/3 would be 1.34, 0.34 is stored in accumulation register 22. At time=1, rotating queue 10 reaches stationary queue 10 and its contents are transferred onto stationary queue 20. VC entry 14 with m/i term=3/2 on stationary queue 20 is transmitted on transmission line 30 and rescheduled onto rotating queue 10 one position removed from stationary queue 20. Since the step for m/i=3/2 would be 1.5, 0.5 is stored in accumulation register 22. At time=2, VC entry 14 with m/i term=4/3 is transmitted on transmission line 30 and rescheduled at the end of stationary queue 20, since the difference between the current time and time stamp 23 is equal to the step size, computed by adding the value stored into accumulation register 23, 0.5, to m/i=1.5. At time=3, VC entry 14 with m/i term=2/1 on stationary queue 20 is transmitted on transmission line 30 and rescheduled to the end of stationary queue 20, since the difference between the current time and time stamp 23 is equal to the step size m/i=2. At time=4, VC entry 14 with m/i term=4/3 is transmitted on transmission line 30 and rescheduled at the end of stationary queue 20, since the difference between the current time and time stamp 23 is greater than the step size, computed by adding the value stored into accumulation register 23, 0.5, to m/i=1.5. At time=5, VC entry 14 with m/i term=2/1 on stationary queue 20 is transmitted on transmission line 30 and rescheduled to the end of stationary queue 20, since the difference between the current time and time stamp 23 is greater than the step size m/i=2.

FIGS. 11A–11H offer a pictorial, step-by-step representation of the operation of a single scheduler with m=3 and i=2. At time=0 (FIG. 11A), a single VC entry 14 is queued on rotating queue 31 at position 32 on time wheel 35, while stationary queue 33 is empty and no entries are present on transmission line 30. At time=1 (FIG. 11B), VC entry 14 is moved to stationary queue 33, transmitted on transmission line 30 and rescheduled on rotating queue 31 at position 32 on time wheel 35. At time=2 (FIG. 11C), VC entry 14 is again moved to stationary queue 33, transmitted and rescheduled on rotating queue 31 at position 34 on time wheel 35, rather than at position 32 because accumulation register 22 has now overflowed. At time=3 (FIG. 11D), then, we find the queues in the same state as at time=0 and the same steps as at times 0, 1 and 2 are repeated at times 3,4 and 5 respectively. Thus, transmission line 30 at time=7 (FIG. H) shows a pattern of transmission of two VC entries every three cell-times as expected.

FIGS. 12A–12P offer a pictorial, step-by-step representation of the operation of a single scheduler with two VC entries 14 with m and i terms equal to 3 and 2 and 9 and 2 respectively. At time=0 (FIG. 12A), two VC entries 36 and 38 are queued on rotating queue 31 at position 32 on time wheel 35, while stationary queue 33 is empty and no entries are present on transmission line 30. At time=1 (FIG. 12B), VC entry 36 is moved to stationary queue 33, transmitted on transmission line 30 and rescheduled on rotating queue 31 at position 32 on time wheel 35. At time=2 (FIG. 12C), VC entry 36 is moved to stationary queue 33 and VC entry 38 is transmitted on transmission line 30 and rescheduled on rotating queue 31 at position 42 on time wheel 35. At time=3 (FIG. 12D), VC entry 36 is transmitted on transmission line 30 and rescheduled on rotating queue 31 at position 32 on time wheel 35. At time=4 (FIG. 12E), VC entry 36 is moved to stationary queue 33, transmitted on transmission line 30 and rescheduled on rotating queue 31 at position 32 on time wheel 35. At time=5 (FIG. 12F), VC entry 36 moved to stationary queue 33 and VC entry 38 is moved to stationary queue 33, transmitted on transmission line 30 and rescheduled on rotating queue 31 at position 44 on time wheel 35. At time=6 (FIG. 12G), VC entry 36 is moved to stationary queue 33, transmitted on transmission line 30 and rescheduled on rotating queue 31 at position 32 on time wheel 35. At time=7 (FIG. 12H), VC entry 36 is moved to stationary queue 33, transmitted on transmission line 30 and rescheduled on rotating queue 31 at position 32 on time wheel 35. At time=8 (FIG. 12I), VC entry 36 is moved to stationary queue 33, transmitted on transmission line 30 and rescheduled on rotating queue 31 at position 34 on time wheel 35. At time=9 (FIG. 12J), VC entries 38 and 36 are both moved to rotating queue 31 at position 32 on time wheel 35. At time=10 (FIG. 12K), VC entry 36 is moved to stationary queue 33 and VC entry 38 is moved to stationary queue 33, transmitted on transmission line 30 and rescheduled on rotating queue 31 at position 40 on time wheel 35. At time=11 (FIG. 12L), VC entry 36 is transmitted on transmission line 30 and rescheduled on stationary queue 33, since the time elapsed since it was last serviced is equal to its step. At time=12 (FIG. 12M), VC entry 36 is transmitted on transmission line 30 and rescheduled on rotating queue 31 at position 34 on time wheel 35. At time=13 (FIG. 12N), VC entry 36 is moved to stationary queue 33, transmitted on transmission line 30 and rescheduled on rotating queue 31 at position 32 on time wheel 35. At time=14 (FIG. 12O), VC entry 36 is moved to stationary queue 33 and VC entry 38 is moved to stationary queue 33, transmitted on transmission line 30 and rescheduled on rotating queue 31 at position 44 on time wheel 35. At time=15 (FIG. 12P), VC entry 36 is transmitted on transmission line 30 and rescheduled on rotating queue 31 at position 32 on time wheel 35.

Figure 13:
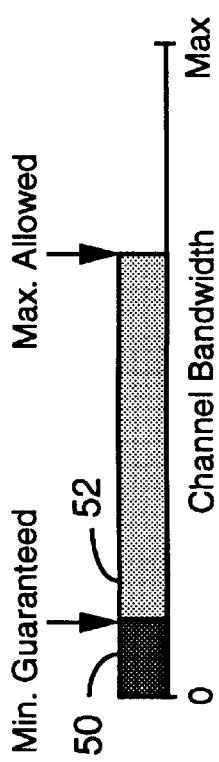
FIG. 13 is a two-dimensional graph representing the relationship between a minimum guaranteed bandwidth and a maximum allowed bandwidth in a multiple scheduler embodiment of the present invention.
Figure 14:
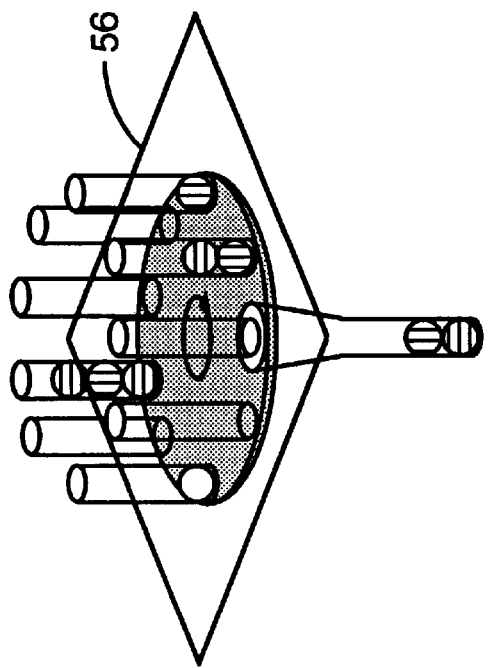
FIG. 14 is a perspective view of a multiple scheduler embodiment of the present invention.
Figure 14:
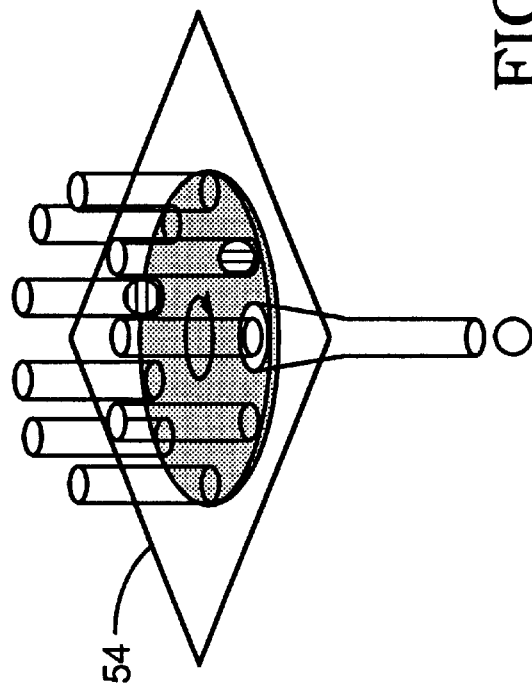

Finally, multiple schedulers may be used in parallel to implement particular arbitration/priority schemes. For example, one might want to assign to a virtual channel a minimum guaranteed bandwidth, but at the same time limit the maximum bandwidth that can be taken by this VC at any particular time. FIG. 13 illustrates the relationship between the minimum guaranteed bandwidth 50 and the maximum allowed bandwidth 52. This can be accomplished with two schedulers working in parallel. FIG. 14 depicts two schedulers according to the preferred embodiment of FIG. 3: scheduler 54, with m and i attributes equal to the minimum guaranteed bandwidth 50 and scheduler 56, with m and i terms equal to the difference between the maximum allowed bandwidth 52 and the minimum guaranteed bandwidth 50. The desired bandwidth allocation is achieved by giving scheduler 56 priority over scheduler 58.

Another way of describing this scheme is offered by the "doubly leaky bucket" of FIG. 15. Bucket 70 is filled with liquid 72. Faucets 74 and 76 allow liquid 72 to drain into funnel 78 at different rates. If faucet 74 is set to a rate corresponding to the minimum guaranteed bandwidth 50 and faucet 76 is set to a rate corresponding to the difference between the maximum allowed bandwidth 52 and the minimum guaranteed bandwidth 50, liquid 72 will drain into funnel 78 in a fashion analogous to that in which VC entries are processed by schedulers 56 and 58 in FIG. 14.

In addition, several lower bandwidth channels may be multiplexed onto a single, higher bandwidth channel by using multiple schedulers. In FIG. 16, scheduler 80 is used to divide bandwidth among several low bandwidth channels and scheduler 82 is used to assign the appropriate bandwidth to each channel's VCs.

Furthermore, several VCs may be carried over a single virtual path (VP). In FIG. 17, scheduler 84 is used to provide the appropriate bandwidth to several VPs, while scheduler 86 is used to provide appropriate bandwidth to the VCs in one of the VPs.

Figure 19:
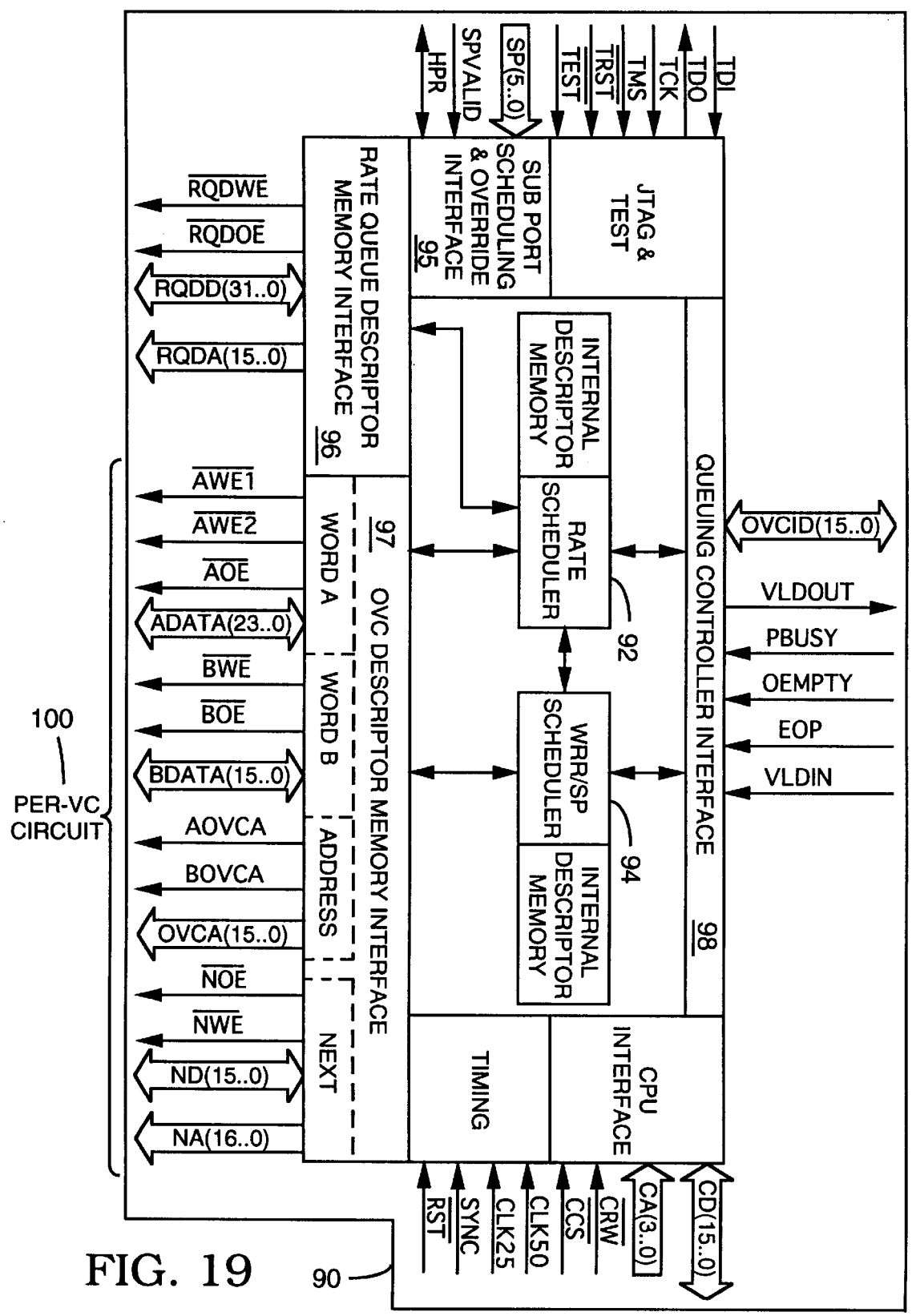
FIG. 19 is a block diagram of an integrated circuit for scheduling of ATM cells, according to one embodiment of the invention.

A block diagram of an integrated circuit for ATM cell scheduling according to one embodiment of the invention is shown in FIG. 19. ATM cell scheduler 90 comprises a time-wheel scheduler 92, as well as a weighted round robin/strict priority scheduler 94. Weighted round robin schedulers are described copending, commonly assigned U.S. patent application Ser. No. 08/843,108, entitled "METHOD FOR WEIGHTED FAIR QUEUEING FOR ATM CELL SCHEDULING" by Alexander Joffe, which is incorporated herein by reference in its entirety.

ATM cell scheduler 90, further includes a subport scheduling interface module 95, a queue rate descriptor memory interface module 96, an OVC descriptor memory interface 97 and a queuing controller interface 98. A listing of signals received and transmitted by ATM cell scheduler 90 and their corresponding pins is provided in Appendix A.

Figure 20:
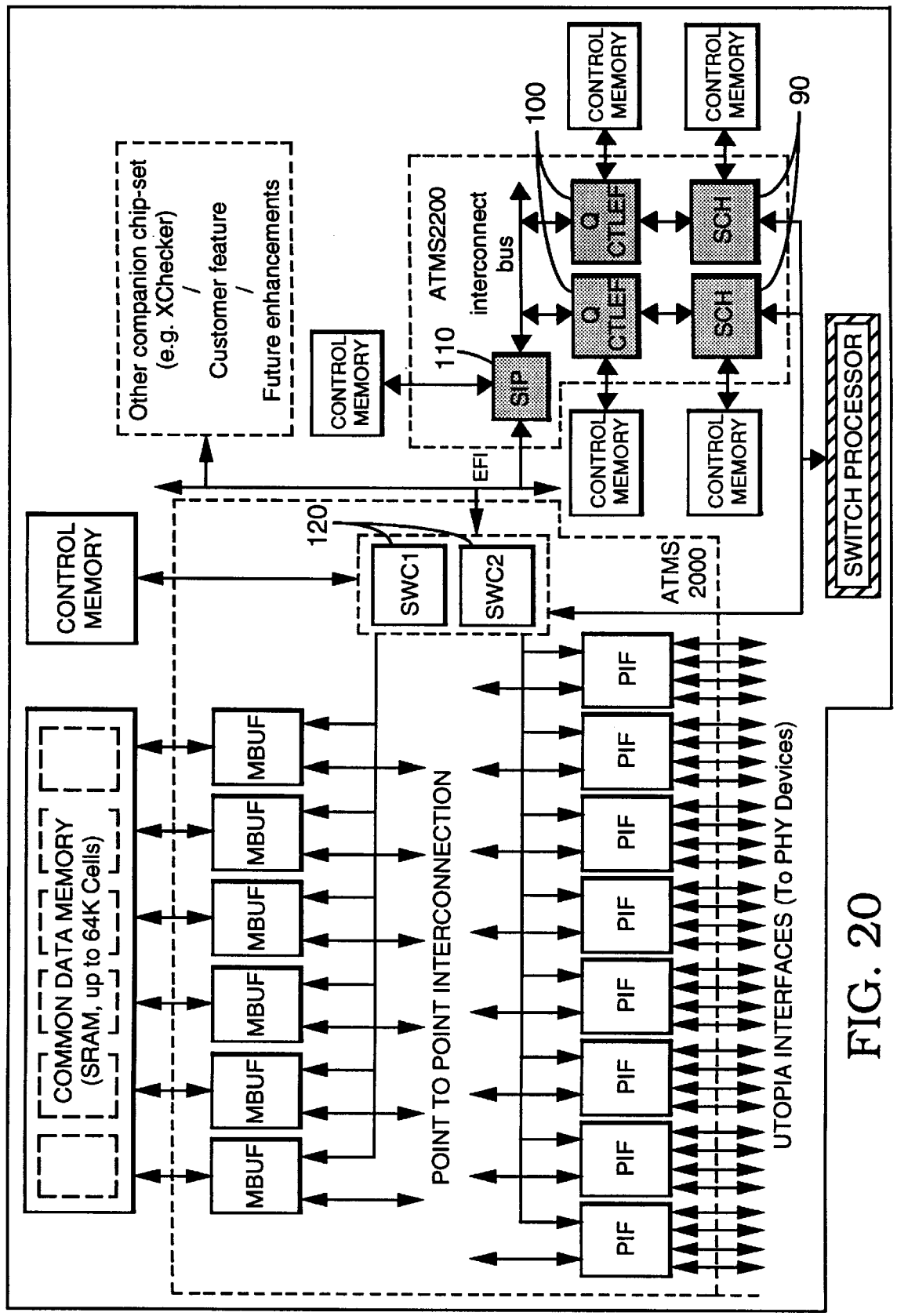
FIG. 20 is a block diagram of an ATM switch according to one embodiment of the invention.

ATM cell scheduler 90 interfaces with Per-VC circuit 100 via OVC descriptor memory interface 97. Per-VC circuit 100 includes storage for data structures representing VC cells. By exchanging signals with Per-VC circuit 100 according to a predetermined protocol, ATM cell scheduler 90 controls the scheduling of ATM cells queued on the ATM switch of FIG. 20. FIG. 20 illustrates the structure of an ATM switch according to the present invention. Switch controllers 120 interface through switch interface 110 with per-VC circuits 100. Per-VC circuits 100 exchange signals with schedulers 90 to perform the scheduling of ATM cells for transmission. The ATM switch of FIG. 20 is described in U.S. patent application Ser. No. 08/706,104, entitled "CELL QUEUING IN ATM SWITCHES" by Alexander Joffe, Ari Birger and Pravat Mishra, which is incorporated herein by reference in its entirety.

APPENDIX A

| Symbol | Timing | Width | I/O | Type Function |
|---|---|---|---|---|
| Queuing Controller Interface | | | | |
| OVCID[15 . . . 0] | output, −S1–S33, input, S36–S0 | 16 | I/O | Output Virtual Circuit Identifier<br>This interface is used to transfer OVCIDs to and from the XStream Queuing Controller at pipeline time t + 2.<br>Odd Ports: t + 2 Cycle = S3, S5, S7, S9, S11, S13, S15, S17, . . . , S33<br>Even Ports: t + 2 Cycle = S2, S4, S6, S8, S10, S12, S14, S16, . . . , S32<br>CPU Port: t + 2 Cycle = S1<br>Note that the CPU port is always scheduled by the even scheduler. |
| VLDOUT | output, t + 2 | 1 | O/T | Valid OVCID out<br>This signal is used to qualify the OVCID during cycles when the Scheduler is expected to drive the OVCID interface. |
| PBUSY | output, t + 4 | 1 | I | Port Busy Indication<br>This is a back pressure signal used to indicate when a port is full an ca not accept further cells |
| OEMPTY | output, t + 4 | 1 | I | OVC Empty<br>Indicates to the Scheduler that this cell is the last one waiting for transmission on this particular OVC. |
| EOP | output, t + 4 | 1 | I | End Of Packet<br>Indicates to the Scheduler that this cell is the last one in the current frame |

APPENDIX A-continued

| Symbol | Timing | Width | I/O | Type Function |
|---|---|---|---|---|
| VLDIN | S36–S0 | 1 | I | Valid OVC in<br>Indicates that a valid OVCID value is being driven by a Queuing Controller<br>A maximum of 32 OVCIDs may be transferred in one switch cycle and the<br>cycle timing of this information is not related to specific input ports. |
| CPU Interface | | | | |
| CD[15 . . . 0] | | 16 | I/O | CPU Data |
| CA[3 . . . 0] | | 3 | I | CPU Address<br>These signals determine the address of an internal register |
| $\overline{CRW}$ | | 1 | I | CPU Read/Write<br>This signal determines the direction of the CPU access<br>'0' - Write Access<br>'1' - Read Access |
| $\overline{CCS}$ | | 1 | I | CPU Chip Select - Active Low |
| Timing | | | | |
| CLK50 | | 1 | I | 50 MHz System Clock |
| CLK25 | | 1 | I | 25 MHZ System Clock<br>Locked in phase to CLK50 |
| SYNC | | 1 | I | SYNC<br>This signal synchronizes the system to cycles of 68 25 MHz clocks. The sig-<br>nal is asserted for one clock prior to the rising edge of the first clock of the<br>Switch Cycle. |
| $\overline{RST}$ | | 1 | I | Reset<br>Should be derived from the RSTO signal generated by the Switch Controller |
| OVC Descriptor<br>Memory Interface | | | | |
| NA[16 . . . 0] | | 17 | O | Next Memory Address |
| ND[15 . . . 0] | | 16 | I/O | Next Memory Data |
| $\overline{NWE}$ | | 1 | O | Next Memory Write Enable Active low |
| $\overline{NOE}$ | | 1 | O | Next Memory Output Enable Active low |
| OVCA[15 . . . 0] | | 16 | O | OVC Descriptor Memory Address<br>This is the address used for accesses to OVC Descriptor Memory WORDA &<br>WDRDB |
| BOVCA | | 1 | O | WORD B Memory Address<br>Address line connected only to OVC Descriptor Memory WORD B.<br>This address line is used to distinguish between Time Stamp and Weight<br>fields in OVC descriptor memory. This address line may be connected to the<br>least significant memory address line or the most significant memory<br>address line.<br>OVCA[15 . . . 0] should be connected to either A[1 . . . 16] or A[0 . . . 15]<br>of the memory depending on the connection of BOVCA. |
| AOVCA | | 1 | O | WORD A Memory Address<br>Address line connected only to OVC Descriptor Memory WORD A.<br>This address line is used to distinguish between Configuration and Mantissa/<br>Fraction fields in OVC descriptor memory. This address line may be con-<br>nected to the least significant memory address line or the most significant<br>memory address line.<br>OVCA[15 . . . 0] should be connected to either A[1 . . . 16] or A[0 . . . 15]<br>of the memory depending on the connection of AOVCA. |
| BDATA[15 . . . 0] | | 16 | I/O | WORD B Memory Data<br>Data signals for WORDB |
| $\overline{BOE}$ | | 1 | O | WORD B Memory Output Enable - Active low |
| $\overline{BWE}$ | | 1 | O | WORD B Memory Write Enable - Active low |
| ADATA[23 . . . 0] | | 24 | I/O | WORD A Memory Data |
| $\overline{AOE}$ | | 1 | O | WORD A Memory Output Enable - Active low |
| $\overline{AWE1}$ | | 1 | O | WORD A Memory Write Enable 1 - Active low<br>Used to write to ADATA[7 . . . 0] |
| $\overline{AWE2}$ | | 1 | O | WORD A Memory Write Enable 2 - Active low<br>Used to write to ADATA[23 . . . 8] |
| Rate Queue Descriptor<br>Memory Interface | | | | |
| RQA[15 . . . 0] | | 16 | O | Rate Queue Memory Address |
| RQD[31 . . . 0] | | 32 | I/O | Rate Queue Memory Data |
| $\overline{RQDOE}$ | | 1 | O | Rate Queue Memory Output Enable - Active low |
| $\overline{RQDRW}$ | | 1 | O | Rate Queue Memory Write Enable - Active low |
| Sub Port Scheduling<br>and Override Interface | | | | |
| SP[5 . . . 0] | output t − 3 | 6 | I | Sub Port Identifier<br>This is an input from the Sub-Port Scheduler. Using this interface the Sub<br>Port Scheduler indicates the relative Sub Port number which should be<br>scheduled next for this port. This input is not required when Sub Ports are<br>not being used. |

APPENDIX A-continued

| Symbol | Timing | Width | I/O | Type | Function |
|---|---|---|---|---|---|
| SPVALID | output t − 3 | 1 | I | | Sub Port ID Valid |
| | | | | | The Sub Port Scheduler drives this signal high when a valid Sub Port ID is presented on SP[5 . . . 0] |
| HPR | output, t0 | 1 | I/O | | High Priority Override |
| | | | | | This signal is driven by the high priority scheduler to indicate that it will drive the OVCID bus during the next clock cycle. The priority of the scheduter is programmed during system initialization. |
| JTAG | | | | | |
| TDI | | 1 | I | | JTAG Test Data In |
| TDO | | 1 | O | | JTAG Test Data Out |
| TCK | | 1 | I | | JTAG Test Clock |
| TMS | | 1 | I | | JTAG Test Data In |
| TRST | | 1 | I | | JTAG Test Reset |
| TEST | | 1 | I | | When asserted all outputs are tri-stated |
| Power Supply | | | | | |
| VSS | | | | | Connection to ground. |
| | | | | | 'Core' indicates connection to core logic and 'I/O' indicates connection to the device I/O pads. |
| VDD | | | | | Connection to +3.3 V supply. |
| | | | | | 'Core' indicates connection to core logic and 'I/O' indicates connection to the device I/O pads. |

We claim:

1. A method of operating a cell scheduler for asynchronous time mode transfer of virtual channel entries at predetermined cell transmission time intervals, the cell scheduler comprising a plurality of queues of a first type, at least one queue of a second type, and means for transferring virtual channel entries among the first and the second queue, the method comprising at each interval:

iteratively selecting one of the queues of the first type;

if the selected queue has at least one entry, transferring all entries of the first type from the selected queue to a queue of the second type;

if the queue of the second type has at least one entry, transmitting an entry at a head of the queue of the second type, the entry at the head of the queue of the second type having a step;

if a period of time elapsed since the entry at the head of the queue of the second type was last transmitted is less than the step of the entry at the head of the queue of the second type, appending said entry at the head of the queue of the second type to a tail of one of the queues of the first type; and if a period of time elapsed since the entry at the head of the queue of the second type was last transmitted is not less than the step of the entry at the head of the queue of the second type, appending the entry at the head of the queue of the second type to a tail of the queue of the second type.

2. The method of claim 1, wherein transmitting the entry at the head of the queue of the second type is determined by:

adding a step size to an accumulated value;

extracting an integer part of the accumulated value; and subtracting the integer part from the accumulated value.

3. The method of claim 1, wherein the period of time elaped since the entry at the head of the queue of the second type was last transmitted is determined by:

subtracting a timestamp value of the entry at the head of the queue of the second type from a current time.

4. The method of claim 1, further comprising:

updating the current time; and adding the step to a timestamp value if the time elapsed is greater than the step.

5. A cell scheduler to be used in asynchronous time mode transfer of virtual channel entries, the scheduler comprising:

a plurality of queues of a first type;

at least one queue of a second type; and means for transferring virtual channel entries to and from each of said queues of a first type and a queue of a second type;

wherein one of the queues of the first type is selected;

if the selected queue has at least one entry, all entries of the first type are transferred from the slected queue to a queue of the second type;

if the queue of the second type has at least one enty, an entry at a head of the queue of the second type is transmitted, the entry at the head of the queue of the second type having a step;

if a period of time elapsed since the entry at the head of the queue of the second type was last transmitted is less than the step of the entry at the head of the queue of the second type, said entry at the head of the queue of the second type is appended to a tail of one of the queues of the first type; and if a period of time elapsed since the entry at the head of the queue of the second type was last transmitted is not less than the step of the entry at the head of the queue of the second type, the entry at the head of the queue of the second type is appended to a tail of the queue of the second type.

6. The system of claim 5, further comprising one or more Virtual Channels (VC).

7. The system of claim 5, wherein each of the queues further comprises zero or more VC entries.

8. The system of claim 6, wherein each of the VCs further comprises:

a step value;

an accumulated result; and a timestamp.

9. A scheduling system to be used in asynchronous time mode transfer of virtual channel entries, the system comprising first and second cell schedulers, the first cell scheduler having a first priority and the second cell scheduler having a second priority, lower than the first priority, wherein the first and the second cell schedulers further comprise:

a plurality of queues of a first type;

at least one queue of a second type; and means for transferring virtual channel entries to and from each of said queues of a first type and a queue of a second type;

wherein one of the queues of the first type is selected;

if the selected queue has at least one entry, all entries of the first type are transferred from the selected queue to a queue of the second type;

if the queue of the second type has at least one entry, an entry at a head of the queue of the second type is transmitted, the entry at the head of the queue of the second type having a step;

if a period of time elapsed since the entry at the head of the queue of the second type was last transmitted is less than the step of the entry at the head of the queue of the second type, said entry at the head of the queue of the second type is appended to a tail of one of the queues of the first type; and if a period of time elapsed since the entry at the head of the queue of the second type was last transmitted is not less than the step of the entry at the head of the queue of the second type, the entry at the head of the queue of the second type is appended to a tail of the queue of the second type.

10. A scheduling system to be used in asynchronous time mode transfer of virtual channel entries, the system comprising first and second cell schedulers, wherein an output line of the first cell scheduler is coupled to an input line of the second cell scheduler and the first and the second cell schedulers further comprise:

a plurality of queues of a first type;

at least one queue of a second type; and means for transferring virtual channel entries to and from each of said queues of a first type and a queue of a second type;

wherein one of the queues of the first type is selected;

if the selected queue has at least one entry, all entries of the first type are transferred from the selected queue to a queue of the second type;

if the queue of the second type has at least one entry, an entry at a head of the queue of the second type is transmitted, the entry at the head of the queue of the second type having a step;

if a period of time elapsed since the entry at the head of the queue of the second type was last transmitted is less than the step of the entry at the head of the queue of the second type, said entry at the head of the queue of the second type is appended to a tail of one of the queues of the first type; and if a period of time elapsed since the entry at the head of the queue of the second type was last transmitted is not less than the step of the entry at the head of the queue of the second type, the entry at the head of the queue of the second type is appended to a tail of the queue of the second type.

11. The system of claim 9, wherein each of the cell schedulers further comprises a plurality of virtual channel entries, and a virtual channel entry scheduled for immediate transmission on the first scheduler is transmitted before a virtual channel entry scheduled for transmission on the second scheduler.

* * * * *